United States Patent
Halavy et al.

(10) Patent No.: US 8,760,492 B2
(45) Date of Patent: Jun. 24, 2014

(54) METHOD AND SYSTEM FOR SWITCHING BETWEEN VIDEO STREAMS IN A CONTINUOUS PRESENCE CONFERENCE

(75) Inventors: Avishay Halavy, Tel Aviv (IL); Efrat Be'ery, Petach-Tikva (IL); Erez Harel, Rishon Letzion (IL)

(73) Assignee: Polycom, Inc., San Jose, CA (US)

( * ) Notice: Subject to any disclaimer, the term of this patent is extended or adjusted under 35 U.S.C. 154(b) by 220 days.

(21) Appl. No.: 13/487,703

(22) Filed: Jun. 4, 2012

(65) Prior Publication Data
US 2012/0236111 A1    Sep. 20, 2012

Related U.S. Application Data

(63) Continuation-in-part of application No. 12/542,450, filed on Aug. 17, 2009, now Pat. No. 8,228,363.

(60) Provisional application No. 61/522,474, filed on Aug. 11, 2011, provisional application No. 61/148,722, filed on Jan. 30, 2009.

(51) Int. Cl.
*H04N 7/14* (2006.01)
*H04N 7/15* (2006.01)

(52) U.S. Cl.
CPC .................................. *H04N 7/152* (2013.01)
USPC .................................... 348/14.09; 348/14.08

(58) Field of Classification Search
USPC ................ 348/14.01, 14.02, 14.07–14.15; 370/259, 260; 709/204
See application file for complete search history.

(56) References Cited

U.S. PATENT DOCUMENTS

| 7,133,362 | B2 * | 11/2006 | Chu et al. ....................... 370/230 |
| 7,139,015 | B2 * | 11/2006 | Eshkoli et al. ............. 348/14.07 |
| 2003/0174202 | A1 * | 9/2003 | Eshkoli et al. ............. 348/14.08 |

OTHER PUBLICATIONS

Karczewicz, M. and Kurceren, R., "The SP- and SI-Frames Design for H.264/AVC," IEEE Transactions on Circuits and Systems for Video Technology, vol. 13, No. 7, Jul. 2003, 8 pages.

Walter, M., "Advanced Bitstream Switching for Wireless Video Streaming," Institute for Communications Engineering, Munich University of Technology, Prof. Dr.-Ing. J. Hagenauer, Diploma Thesis, Nov. 26, 2004, 103 pages.

\* cited by examiner

*Primary Examiner* — Tuan D Nguyen
(74) *Attorney, Agent, or Firm* — Wong, Cabello, Lutsch, Rutherford & Brucculeri, L.L.P.

(57) ABSTRACT

An MRC system includes an MRM and an MRE that handle needs for Intra frames in an efficient way, improves the conferees experience, and reduces the load on the resources associated with that MRC videoconference by reducing the number of Intra frames and lowering the impact of Intra frames when they are needed. In some embodiments, when a requiring MRE requests an Intra frame for a video stream received from a presenting MRE, an MRM may respond by requesting the presenting MRE to send a temporary video stream toward the requiring MRE while sending in parallel a normal stream toward the rest of the MREs.

22 Claims, 13 Drawing Sheets

METHOD AND SYSTEM FOR SWITCHING BETWEEN VIDEO STREAMS IN A CONTINUOUS PRESENCE CONFERENCE

CROSS REFERENCE TO RELATED APPLICATIONS

This application is a continuation-in-part of U.S. patent application Ser. No. 12/542,450, entitled "METHOD AND SYSTEM FOR CONDUCTING CONTINUOUS PRESENCE CONFERENCE," filed on Aug. 17, 2009, which claims the benefit of the filing date of U.S. Provisional Application No. 61/148,772, entitled METHOD AND SYSTEM FOR CONDUCTING CONTINUOUS PRESENCE CONFERENCES, filed on Jan. 30, 2009, the entire contents of both of which are incorporated by reference in their entirety herein. This application also claims priority to U.S. Provisional Application Ser. No. 61/522,474, entitled "METHOD AND SYSTEM FOR SWITCHING BETWEEN STREAMS IN A CONTINUOUS PRESENCE CONFERENCE," filed on Aug. 11, 2011, the content of which is incorporated by reference in its entirety herein.

TECHNICAL FIELD

The present invention relates to video communication and more particularly to the field of multipoint video conferencing.

BACKGROUND ART

As traffic over Internet Protocol (IP) networks continues its rapid growth, with the growth of the variety of video conferencing equipment, more and more people use video conferencing as their communication tool. A multipoint conference between three or more participants requires a Multipoint Control Unit (MCU). An MCU is a conference controlling entity that is typically located in a node of a network or in a terminal which receives several channels from endpoints. According to certain criteria, the MCU processes audio and visual signals and distributes them to a set of connected channels. Examples of MCUs include the MGC-100, RMX® 2000, both of which are available from Polycom, Inc. (RMX 2000 is a registered trademark of Polycom, Inc.). A terminal (which may be referred to as an endpoint) is an entity on the network, capable of providing real-time, two-way audio and/or audio visual communication with other terminals or with the MCU. A more thorough definition of an endpoint and an MCU can be found in the International Telecommunication Union ("ITU") standards, such as the H.320, H.324, and H.323 standards, which can be found at the ITU website: www.itu.int.

An MCU may include a plurality of audio and video decoders, encoders, and bridges. The MCU may use a large amount of processing power to handle audio and video communications between a variable number of participants (endpoints). The communication can be based on a variety of communication protocols and compression standards and may be received from different endpoints. The MCU may need to compose a plurality of input audio or video streams into at least one single output stream of audio or video (respectively) that is compatible with the properties of at least one conferee (endpoint) to which the output stream is being sent. The compressed audio streams received from the endpoints are decoded and can be analyzed to determine which audio streams will be selected for mixing into the single audio stream of the conference. For purposes of the present disclosure, the terms decode and decompress can be used interchangeably.

A conference may have one or more video output streams where each output stream is associated with a layout. A layout defines the appearance of a conference on a display of one or more conferees that receives the stream. A layout may be divided into one or more segments where each segment may be associated with a video input stream that is sent by a conferee (endpoint). Each output stream may be constructed of several input streams, resulting in a continuous presence (CP) conference. In a CP conference, a user at a remote terminal can observe, simultaneously, several other participants in the conference. Each participant may be displayed in a segment of the layout, where each segment may be the same size or a different size. The choice of the participants displayed and associated with the segments of the layout may vary among different conferees that participate in the same session.

An MCU may need to decode each input video stream into uncompressed video of a full frame, manage the plurality of uncompressed video streams that are associated with the conferences, and compose and/or manage a plurality of output streams in which each output view stream may be associated with a conferee or a certain layout. The output stream may be generated by a video output port of the MCU. A video output port may comprise a layout builder and an encoder. The layout builder may collect and scale the different uncompressed video frames from selected conferees into their final size and place them into their segment in the layout. Thereafter, the video of the composed video frame is encoded by the encoder and sent to the appropriate endpoints. Consequently, processing and managing a plurality of videoconferences require heavy and expensive computational resources and therefore an MCU is typically an expensive and rather complex product. MCUs are disclosed in several patents and patent applications, for example, U.S. Pat. Nos. 6,300,973, 6,496,216, 5,600,646, or 5,838,664, the contents of which are incorporated herein by reference. These patents disclose the operation of a video unit in an MCU that may be used to generate the video output stream for a CP conference.

The growing trend of using video conferencing raises the need for low cost MCUs that will enable conducting a plurality of conferencing sessions having composed CP video images.

There are existing techniques for composing compressed video streams into a CP video image with fewer resources than a conventional MCU. Some techniques disclose the use of an image processing apparatus for composing a plurality of Quarter Common Intermediate Format (QCIF) coded images into one CIF image. These techniques do not require the decoding of a plurality of coded images when the images are compressed using the H.261 standard. QCIF is a videoconferencing format that specifies a video frame containing 144 lines and 176 pixels per line, which is one-fourth of the resolution of Common Intermediate Format (CIF). QCIF support is required by some of the International Telecommunications Union (ITU) videoconferencing standards.

Other techniques to overcome the QCIF limitation of size and layouts use a sub-encoding method. One such sub-encoding method is disclosed in U.S. Pat. No. 7,139,015, which is incorporated herein by reference in its entirety for all purposes.

Other video conferencing systems use Media Relay Conferencing (MRC). In MRC a Media Relay MCU (MRM) receives one or more streams from each participating Media Relay Endpoint (MRE), which may be referred to herein as relay RTP compressed video streams or relay streams. The MRM relays to each participating endpoint a set of multiple video streams received from other endpoints in the conference, which may be referred to herein as relayed RTP compressed video streams or relayed streams. Each receiving endpoint uses the multiple streams to generate the CP video image according to a layout. The CP video image is presented to the MRE's user. An MRE can be a terminal of a conferee in the session which has the ability to receive relayed media from an MRM and deliver compressed media according to instructions from an MRM. MRMs are described in more detail in U.S. Patent Publication No. 2010/0194847, which is incorporated herein by reference in its entirety for all purposes. For purposes of the present disclosure, the terms endpoint and MRE may be used interchangeably.

In some MRC systems, a transmitting MRE sends its video image in two or more streams, each stream associated with different quality level. Such a system can use the plurality of streams to provide different window sizes in the layouts, different resolutions used by each receiving endpoint, etc. Furthermore, the plurality of streams can be used for overcoming packet loss. The qualities may differ in frame rate, resolution and/or signal to noise ratio (SNR), etc.

Video streaming is becoming more and more popular. Furthermore, more and more sources of video streaming as well as video conferencing system deliver a plurality of streams in parallel, where the streams differ from each other by the quality of the compressed video. The quality can be expressed in number of domains, such as time domain (frames per second, for example), spatial domain (high definition (HD) or CIF, for example), and/or in quality (sharpness, for example). Video compression standards that are used for video streaming and multi-quality streams include H.264 AVC, H.264 annex G, MPEG-4, etc. More information on compression standards such as H.264 can be found at the ITU website www.itu.int, or at www.mpeg.org.

From time to time, during a conference session, a receiving MRE needs an Intra frame from one of the transmitting MREs. The Intra frame can be requested due to missing packets, changes in the layout presented in the receiving MRE, a participant joining an ongoing videoconferencing session, etc. In some cases the Intra frame is requested only by one of the receiving MREs, and not by other MREs that participate in the session and obtain the same quality level stream. An Intra frame is a video frame that was compressed relative to information that is contained only within the same frame and not relative to any other frame in the video sequence. An Inter frame is a video frame that was compressed relative to information that is contained within the same frame, and also relative to one or more other frame (reference frames) in the video sequence. An Inter frame can include a predictive frame (a P frame), and/or a bidirectional predictive frame (a B frame). In video conferencing, B frames are not typically used because of the latency they introduce. In the following description the term P frame is used as a representative term for an Inter frame.

Video streaming may involve lost packets, jumping forward while playing the video, or switching between streams of different qualities. In order to support those capabilities, video compression standards offer special frame types that are periodically placed along the streams. The first type of special frame is a Switching P frame (SP). An SP frame is similar to a P frame (using similar macroblock mode, and motion compensate prediction). However, SP frames allow identical frames to be reconstructed even when they are predicted using different reference frames. The second special frame type is referred as a secondary SP frame (SSP). The SSP frame uses special encoding. Regardless of which reference frames, macroblocks, or motion vectors were used for encoding the SSP frame, the decoding will always reconstruct the same picture. The 3rd type of special frame is Switching Intra frame (SI). SI framescan be seen as an Intra frame that identically reconstructs an SP frame. In the present disclosure, the terms encode and compress are used interchangeably.

SP, SSP, and SI frames and the use of these frames for switching between streams or recovery from packet loss is well known in the art of video streaming and will not be further discussed. A reader who wishes to learn more about those frames and the use of those frame is invited to read the H.264 AVC standard as well as "Advanced Bitstream Switching for Wireless Video Streaming," a Diploma Thesis of Michael Walter (Nov. 26, 2004). Another article is "The SP- and SI-Frames Design for H.264/AVC," written by Marta Karczewics et al. and published in IEEE Vol. 13, No. 7 (July 2003).

In response to an Intra request received from a requiring MRE targeted to a relevant MRE, an MRM relays the request to the relevant MRE. In response, the relevant MRE may send an Intra frame toward the MRM that relays the Intra frame to each MRE that is currently receiving the video stream from that relevant MRE, including those MREs that do not need and did not ask for an Intra frame. Intra frame coding efficiency is lower than Inter frame coding efficiency, requiring higher bandwidth for the same quality. Additionally, the encoding/decoding of an Intraframe takes longer time and requires more computing power than that of an Inter frame. Thus, sending the Intra frames to all MREs creates unnecessary load over the communication links and also increases the computing load in the receiving MREs as well as the transmitting MRE. Therefore, in order to maintain the bandwidth constraints, the Intra frame may be encoded in lower quality. Alternatively, the frame rate may be temporarily reduced during the transition period. Thus, in general Intra frames degrade the conferee's experience in that period of time.

SUMMARY OF INVENTION

A novel method and system that reduces the impact on the resources associated with the MRC session and enhances the user experience when an Intra frame is needed by one of the MREs is disclosed.

According to various embodiments, whenone MRE (a requiring MRE) requests an Intra frame for a video stream received from another MRE (a presenting MRE), an MRM may respond by requesting the presenting MRE to send a temporary stream to be relayed toward the requiring MRE while sending in parallel the normal stream to be relayed to the rest of the MREs. Additional embodiments of the novel technique are disclosed in the detailed description.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

The above-described deficiencies in Media Relay Conferencing, do not limit the scope of the inventive concepts of the present disclosure in any manner. The deficiencies are presented for illustration only.

In the following description, for purposes of explanation, numerous specific details are set forth in order to provide a thorough understanding of the invention. It will be apparent, however, to one skilled in the art that the invention may be practiced without these specific details. In other instances, structures and devices are shown in block diagram form in order to avoid obscuring the invention. References to numbers without subscripts or suffixes are understood to reference all instances of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage, etc. In order to execute a certain task a software program may be loaded to an appropriate processor as needed. In the present disclosure the terms task, method, process can be used interchangeably.

Figure 1:
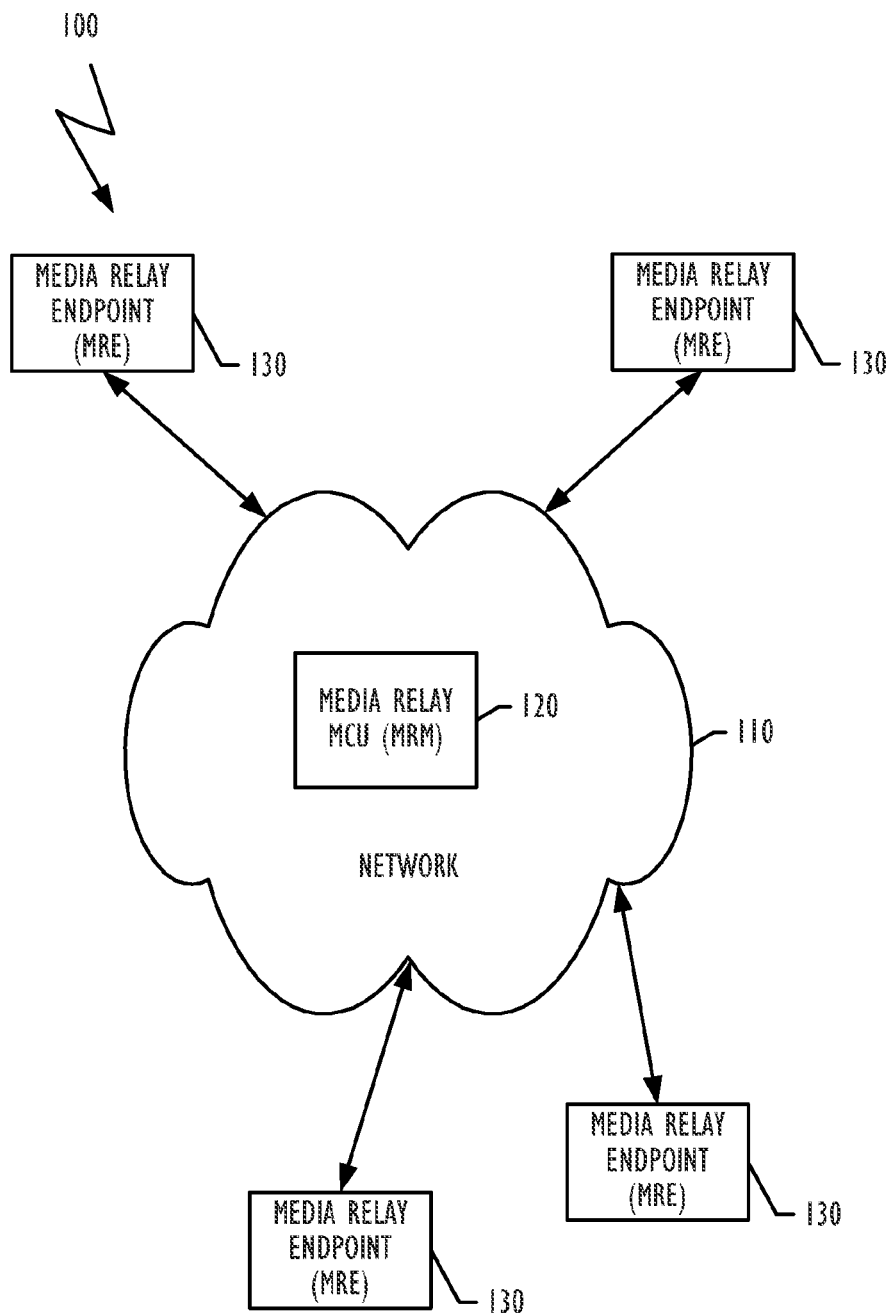
FIG. 1 is a block diagram illustrating a multimedia conferencing system comprising a variety of novel electronic videoconferencing systems, according to one embodiment.

FIG. 1 illustrates a novel multimedia conferencing system 100, according to one embodiment of the present disclosure. System 100 can include a network 110, one or more Media Relay MCUs (MRM) 120, and a plurality of Media Relay Endpoints (MRE) 130. Network 110 may be any desired network, including a packet switched network, a circuit switched network, an IP network, or any combination thereof. The multimedia communication over the network can be based on communication protocols such as H.320, H.323, and SIP, and may use media compression standards such as audio compression standards G.711 and G.719 and/or video compression standards that are used for video streaming and multi-quality streams, such as H.264 AVC, H.264 annex G, MPEG-4, etc.

After establishing the connection with an endpoint, the MRM 120 may instruct the endpoint to deliver compressed audio. The MRM 120 can determine the audio energy of each audio stream and, accordingly, select one or more audio streams to be relayed to the one or more endpoints, where it can be decoded and mixed and be sent to the endpoint loudspeakers.

In a similar way, the MRM 120 may instruct the endpoints to deliver a compressed video image in a certain size that matches the segment size in a layout in which the video image will be presented. The size can be defined by the number of pixels in each direction (height and width), for example. Furthermore, the MRM 120 may appoint one of the endpoints as the current speaker endpoint and may request the current speaker endpoint to deliver its video image in a larger image size, which will fit the speaker's segment in the relevant layout. In some embodiments, endpoints can be adapted to deliver compressed video images in two or more different sizes, wherein each video image size can fit a different segment size (resolution). In such embodiment, a previous speaker endpoint may deliver two sizes of its compressed video image: (i) a regular size to be displayed over a regular conferee's segment layout and (ii) a speaker's size (a larger image) to be presented in the layout segment allocated to the current speaker.

In other embodiments, during an entire MRC session, an endpoint may send its video image in plurality of streams toward the MRM 120. Each stream carries the compressed video image in a different quality. The qualities can differ in the spatial resolution (image size), frame rate, bit rate, sharpness, etc. Further, the MRM 120 may determine which stream to relay to other one or more endpoints.

A current speaker of a conference session can be the conferee whose audio energy is the highest, for example. In an alternate embodiment, a speaker can be the most active conferee during a given period of time. For example, the most active conferee can be defined as the one whose audio energy was the highest for a certain percentage of the period, such as 60 percent or more.

Each MRE 130 is capable of providing real-time, two-way audio and/or visual communication to another MRE 130 or to the MRM 120. An MRE can be a terminal of a conferee in the session, which has the ability to receive relayed compressed media from an MRM and deliver relay compressed audio and video data chunks to the MRM according to instructions from the MRM. The compressed media may be sent as real time protocol (RTP) data chunks. Information on RTP may be found at the Internet Engineering Task Force (IETF) website at www.ietf.org. Each MRE 130 can send relay RTP compressed audio data chunks in the appropriate required bit rate or rates and the required compression standard. Similarly, each MRE 130 can send relay RTP compressed video data chunks in the appropriate required size or sizes, bit rate or frame rates, and the required compression standard. In one embodiment, each MRE 130 can be adapted to send an indication of its audio energy by embedding the audio energy indication in a field in the header or in an Extension header of the relay RTP compressed audio data chunks. The terms data chunks and packets are used interchangeably herein.

In the beginning of an MRC session, the MRM 120 can process the requirements of the conference, including the number of participants, the number of layouts, the number of presented conferees in each layout, and the sizes of the different conferees' images. A presented conferee is a conferee whose video image is presented in a CP video image of at least one other conferee, a receiving conferee. A presented conferee for one of the conferees can be a receiving conferee for another conferee. Based on the requirements of a session, the MRM 120 may negotiate with each of the endpoints in order to establish a connection for each of the streams the endpoint may send or receive during the session.

Each MRE 130 can be associated with an identifier (ID), which can be carried in a RTP header of a relay RTP compressed chunk of media data to identify the source of a received compressed audio or video packet. In one embodiment, the ID can be randomly selected by an MRE 130 and potentially confirmed by the MRM 120 after validating its uniqueness. In another embodiment, the ID can be allocated by the MRM 120 and conveyed to the relevant MRE 130. The MRE 130 may write the ID in the Synchronization Source (SSRC) field in the RTP header of each relay compressed media data chunk. In another embodiment the ID may be written in the Contributing Source (CSRS) field of the RTP header. In an alternate embodiment, the ID can be written in the Extension header of each relay RTP compressed media data chunk. The ID can enable the MRM 120 to identify the source of a received relay RTP compressed audio and/or video packet. Each compressed audio or video stream can be associated with its own ID. In some embodiments the relay RTP compressed audio data chunks and the relay RTP compressed video data chunks of the same MRE 130 may have the same ID. In an alternate embodiment, the relay RTP compressed audio data chunks and the relay RTP compressed video data chunks of the same MRE 130 may have different IDs. In some embodiments, if an MRE 130 sends its video image in a plurality of streams of different quality to the MRM 120, each stream may be assigned a different ID. In some embodiments each segment in a displayed layout can be associated with an ID and the MRM 120 can be responsible for distributing the segment's IDs to each MRE 130 in the session according to different parameters, such as audio energy, for example. In another embodiment, each receiving MRE 130 may determine a segment ID for each segment in its layout and transfer those segment IDs with associated information to the MRM 120. The information for each segment ID may include video parameters required for the segment such as resolution, frame rate, etc. Herein, the term RTP header can comprise the common RTP header as well as also the extensions added to the RTP header.

In some embodiments, the ID is a number; in other embodiments, the ID may be any other value which may provide unique identification of the MRE 130 or the particular stream. In other embodiments, the IP address and the IP port where the relay RTP compressed audio and/or video data chunks are received on the MRM 120 may be used for identification instead of an ID number.

In one embodiment, according to the received audio energy of each conferee (MRE 130), the MRM 120 can determine which conferees will be presented in a CP image in a certain period of the session. The MREs 130 with the highest audio energy can be selected, presented and heard for a future given period of time, for example. MRM 120 can further determine which of the displayed conferees will be displayed in the speaker segment in the layout. In an alternate embodiment, each MRE 130 can determine which conferees will be presented in its displayed layout and which conferee (MRE 130) will be displayed in the speaker segment. In such embodiments, the MRE 130 user can use a click and view option, which is disclosed in U.S. Patent Publication No. 20030174202 the content of which is incorporate, herein by reference. MRM 120 can also route the appropriate received streams to the appropriate MRE 130.

Based on the properties of the session, each endpoint may build its own CP video image. According to its layout, an endpoint may organize received payload packets of compressed video in two or more Compressed Video Segment Memories (CVSM), wherein each CVSM is associated with a segment in the layout. Each CVSM can be associated with an ID number of a compressed video image stream that will be presented in the segment. Storing received compressed video data in the appropriate CVSMs can be based on the ID number embedded within the RTP header of the packet that carries the received compressed video. The association between a CVSM and the ID number can be dynamically changed according to the activities occurring in the session. For example, the association can be changed by a command from the MRM 120 upon a change in the session, such as an endpoint joining or leaving the session, or a change of speaker. An endpoint can have a cross index table that associates an endpoint ID with a segment in a layout. The table can be updated during the session, reflecting the dynamics of the session. Organizing the data in a CVSM can be based on the sequence number of the packets or by the time stamp of the frame that are embedded within the RTP header, for example.

In one embodiment, the endpoints can be adapted to send an indication of their audio energy by embedding this data in a field in the RTP header or in the Extension header of the RTP packet. In such embodiment, the MRM 120 may parse the header of the RTP that carries the audio data to determine the audio energy of each endpoint and select the speaker conferee and/or the presented conferees accordingly. In alternate embodiments, the MRM 120 may instruct the endpoints to send an indication on their audio energy over a signaling or control connection or alternatively the MRM 120 may decode the received audio streams and determine their energy.

In other embodiments, in which the audio compression complies with compression standards G.7221.C or G.719 (for example), the audio codec of the endpoints can be configured to add an indication of the audio energy to the audio header. In such embodiment, the MRM 120 can be adapted to search the header of the audio payload and retrieve the field of the audio energy. In other embodiments, the indication of the audio energy can be sent from the endpoints to the MRM 120 via a dedicated out of band status and control connection.

In addition, an endpoint can be adapted to decode the stored compressed video obtained from each of the CVSMs. The decoded video can be stored in a segment frame memory (FM) module. A segment FM stores decoded video data that is to be presented in the CP at the relevant segment. In some embodiments, a scaler can be added between the decoder and its associated segment FM and can be used for adjusting the size of the received image to the associated segment. Yet in other embodiments, the decoded video can be stored in an FM of a CP image in a section that is associated with a segment in the relevant CVSM.

In one embodiment, a CVSM can be associated with a certain ID for an entire session. In such an embodiment, the MRM 120 can dynamically associate an ID, which represents a CVSM (a segment in a layout), with compressed video data that will be displayed in the relevant segment. In such an embodiment there is no need to inform a receiving endpoint about changes in the layout. The MRM 120 can manage the changes by associating the relevant ID of a segment to the relevant compressed video data that is sent from a conferee that will be presented in the relevant segment. In some embodiments, the ID that represents a segment in a layout can be added to the source ID or the source ID can be replaced by the segment ID.

An MRM 120 may decide that an Intra frame from one of the presenting MREs 130 is needed by one of the receiving MREs 130; referred to as the requiring MRE 130. The decision can be based on an Intra request received from the requiring MRE 130. The request can be sent in response to packet loss or a wish of the conferee of the requiring MRE 130 to add the video image of the presenting MRE 130 to the requiring MRE 130 layout, for example. In some cases, the MRM 120 may determine that an Intra frame from a presented conferee is needed to be sent to a requiring MRE 130. For example, when the requiring MRE 130 joins an ongoing MRC session, then the MRE 130 needs to get an Intra frame from each one of the presented conferees. In conventional video conferencing systems, in those cases the Intra frame will be sent to all the endpoints receiving the video stream even though they do not need the Intra frame. The disclosed techniques avoid transmitting the Intra frames to MREs 130 that do not need it.

In one embodiment, an MRM 120, upon determining that an Intra frame from a presenting MRE 130 is needed by a requiring MRE 130, may further verify whether the decoder of the requiring MRE 130 has one or more reference frames that were decompressed by the decoder while processing previous received video frames from that presenting MRE 130. It is well known in the art that H.264, MPEG-4, and similar encoders and decoders can aggregate and use a plurality of reference frames, up to 16 frames for example. The encoder, while processing a current video image, determines which of those reference frames to use for encoding the current video image. Further, the encoder adds, to the header of the current compressed video image, an indication specifying which reference frame was used for encoding the current compressed video frame. This indication is used by the decoder of the receiving MRE in order to synchronize the decoding process of the received current compressed video image, to the encoding process.

At the beginning of the MRC video session, an MRM 120 may instruct the participating MREs 130 to store a number of reference frames to be used in the encoding/decoding process. The number can be the last two frames, last four, last eight, etc. During the ongoing session, the MRM 120 may need to know which reference frames from the presenting MRE 130 the decoder of the requiring MRE 130 has. In one embodiment, the requiring MRE 130 may signal a request for Intra replacement, accompanied with the frame number corresponding to the last stored reference frame.

In other embodiments, the MRM 120 may keep in a table or other convenient data structure the frame numbers of the last few frames that were sent from each of the MREs 130. Based on this table, the timing of receiving the request for Intra frame from a requiring MRE 130, and the estimated latency between the events of receiving a frame from the presenting MRE 130 at the MRM 120 and getting an Intra request due to not receiving and decoding this frame at the requiring MRE 130, the MRM 120 can estimate which reference frames exist in the requiring MRE 130.

If the MRM 120 determines that the decoder of the requiring MRE 130 has a previous reference frame (this frame can be referred to as an existing previous reference frame, then the MRM 120 may instruct the encoder of the relevant stream of the presented endpoint to compress the next video frame as an Inter frame based on the existing previous reference frame and to delete its previously stored reference frames. In such a case, all receiving MREs 130 get an Inter frame that is compressed based on an older previous frame and from that point onwards all the receiving MREs 130 are synchronized again with the presenting MRE.

If the MRM 120 determines that the decoder of the requiring MRE 130 needs an Intra frame from the presenting MRE 130, then the MRM 120 may start a process of synchronizing the reference frames of the decoders of all receiving MREs 130, including the requiring MRE 130, without sending an Intra frame to all of the receiving MREs 130. In cases where a presenting MRE 130 sends one or more streams, the term presenting MRE 130 normal stream may refer to a stream that is sent to the other MREs 130 that receive the same quality level of the requiring MRE 130.

In some embodiments, multiple consecutive frames may be involved in the synchronization process. One of the reasons for stretching the process across multiple frames is to avoid a jump in the consumption of computing resources at the presenting MRE 130 as well as network resources between the presenting MRE 130 and the MRM 120 and between the MRM 120 and the requiring MRE 130. At some point of time, when the presenting MRE 130 sends frame number M−1, for example, the MRM 120 may instruct the presenting MRE 130 to send an additional stream, a temporary stream, in parallel to the normal stream. The temporary stream is created by encoding the reference frame memory of a normal stream and not the video image received from the camera. The first encoded frame of the temporary stream is an Intra frame. The Intra frame has the same spatial resolution as the normal stream but is compressed with lower quality, less image sharpening, lower frame rate, for example.

When the MRM 120 instruction is received by the presenting MRE 130, the frame M, for example, from the camera of the presenting MRE 130 may be compressed as an Inter frame in one or more quality levels and sent to the MRM 120. In addition, a temporary stream is started by compressing the reference frame of the normal stream that is related to frame M into an Intra frame (TIm) in low quality and is sent to the MRM 120, which in turn relays it to the requiring MRE 130.

The requiring MRE 130 decodes the TIm and the decoded image in low quality is placed in the CP image and presented to the conferee. In parallel, the decoder creates a reference frame related to the reference of frame M of the normal stream of the presenting MRE 130.

The encoder of the presenting MRE 130 continues encoding the temporary stream by encoding as Inter frames the reference memories of the normal stream related to M+1, M+2, etc. up to frame N. The number of frames can be in the range between zero frames up to a predetermined number of frames, for example 10 frames. Those frames can be referred to as quality enhanced frames, because the compression quality of each inter frame is higher than the previous one. Frame N received from the video camera is compressed as an SP frame. The SP frame is sent as a P frame in the normal stream to the other receiving endpoints. This frame can be referred to as SPn. The reference frame at the encoder of the presenting MRE 130, which was created while encoding the SPn frame, is compressed as an SSPn. The SSPn frame is sent to the requiring MRE 130 as the last frame of the temporary stream.

The requiring MRE 130 decodes the received SSPn, creating a reference frame which is related to frame N. The decoded image is placed in the CP video image and presented as frame N. At that point of time the created reference frame due to the decoding of the SSPn is the same as the reference frame memory created at the other receiving MREs 130 having the same quality level as well as the reference memory of the normal stream in the presenting MRE 130. The following frames N+1 and above are encoded once and sent as a normal stream to the requiring MRE 130 and the other receiving MREs 130 having the same quality level.

In another embodiment, the temporary stream can be created from the video image received from the camera and not from the reference frame of the encoder of the normal stream as in the above example. In such an embodiment, the SP and SSP frames are created from the same video image, which is received from the camera. At some point of time, for example, at the time that the presenting MRE 130 sends frame number M-1, the MRM 120 may instruct the presenting MRE 130 to send an additional stream, a temporary stream, in parallel to the normal stream. The temporary stream is created by encoding the video frames received from the video camera as the encoding of the normal stream. The first encoded frame of the temporary stream is an Intra frame of frame M (TIm). The Intra frame has the same spatial resolution as the normal stream but is compressed with lower quality, less image sharpening, lower frame rate, etc.

The requiring MRE 130 decodes the TIm and the decoded image in the low quality is placed in the CP image and presented to the conferee. In parallel, the decoder creates a reference frame related to frame M from the presenting MRE 130. The encoder of the presenting MRE 130 continues encoding the temporary stream by encoding as Inter frames the following video frames received from the video camera. Those Inter frames relate to frames M+1, M+2, and so on up to frame N. The number of frames can be in the range between zero frames up to a predetermined number of frames, for example 10 frames. Those frames can be referred to as quality enhanced frames, because the compression quality of each inter frame is higher than the previous one.

Frame N of the normal stream is compressed differently than the other inter frames. Frame N is compressed as an SP frame. At this point of time the requiring MRE 130 has a similar quality as at least one other receiving MRE 130. However, the reference frame memories of the requiring MRE 130 may not be similar to the other receiving MRE 130.

Therefore the MRM 120 may synchronize the reference frame of the requiring MRE 130 with the other receiving MREs 130 having the same quality stream. In order to synchronize the reference memory of the requiring MRE 130 with the other receiving MREs 130, the MRM 120 may instruct the encoder of the presenting MRE 130 to encode frame N of the temporary stream as an SSPn frame, and the SSPn frame is sent to the requiring MRE 130 as the last frame of the temporary stream.

The requiring MRE 130 decodes the received SSPn, creating a reference frame which is related to frame N. The decoded image is placed in the CP video image and presented as frame N. At this point the reference frame memory created from the decoding of the SSPn is the same as the reference frame memory created at the other receiving MREs 130 having the same quality level as well as the reference memory of the normal stream in the presenting MRE 130. The following frames N+1 and above are encoded once and sent as a normal stream to the requiring MRE 130 and the other receiving MREs 130 having the same quality level.

In another embodiment, in which a plurality of previous encoded reference frames are used, a lossless compression can be used for transferring a previous reference frame with a set of required parameters toward the requiring MRE 130 and then encoding the next frame based on the previous reference frame, for example when the presenting MRE 130 sends frame number M-1. The MRM 120 may instruct the presenting MRE 130 to send an additional stream, a temporary stream, in parallel to the one or more normal streams. The temporary stream is created by lossless compression of the reference frame that was created while encoding frame M-1 of the normal stream. The lossless compressed reference frame (LLCRF) of frame M-1 can be sent out of band, over an IP connection from the presenting MRE 130 to the requiring MRE 130 via the MRM 120. The temporary stream may carry also the set of required parameters such as the "picture parameter set," "sequence parameter set," etc. Information regarding the set of required parameters may be found in compression standards such as H.264.

In another embodiment, the presenting MRE 130 may send the temporary stream directly toward the requiring MRE 130. Sending the LLCRF and the set of required parameters can be done in few packets and can take one or more frame intervals. The lossless compression method can be any lossless method, such as ZIP, Lempel-Ziv=Welch (LZW), lossless JPEG 2000, etc.

In yet another embodiment, a requiring MRE 130 may already receive a stream of relayed RTP compressed video data chunks from a presenting MRE 130 at a first resolution while other MREs 130 may receive a stream of relayed RTP compressed video data chunks from the presenting MRE 130 at a second resolution. The stream at the second resolution can be referred as the normal stream. At a certain time, the requiring MRE 130 may need to change the received stream resolution from the first resolution to the second one. In such an embodiment, the presenting MRE 130 may allocate a temporary encoder. The temporary encoder can be loaded with a transition reference frame of the first resolution. Then, the resolution of the loaded transition reference frame can be changed from the first resolution to the second resolution. In parallel, the resolution of a reference frame of the requiring MRE 130 that is equivalent to the transition reference frame at the presenting MRE 130 can be changed from the first resolution to the second resolution in a similar way as done on the presenting MRE 130. Thus, at this point, the temporary encoder at the presenting MRE 130 and the decoder at the requiring MRE 130 have the same reference frame.

The next one or more video images received from the video camera of the presenting MRE 130 can be compressed by the temporary encoder in the second resolution and be transmitted to the requiring MRE 130 in parallel to the normal stream that is sent to the other receiving endpoints. After the one or more video frames, the regular encoder may compress the next video image received from the video camera as an SP frame and send it over the normal stream toward the one or more receiving MREs 130 while the temporary encoder may compress the same video image as an SSP frame and send it toward the requiring MRE 130. After transmitting the SP and the SSP frame, the presenting MRE 130 may release the temporary encoder and the requiring MRE 130 can receive the normal stream as the other receiving one or more MREs 130. In yet another embodiment, the SP and SSP frames can be created and sent using the transition reference frame.

The requiring MRE 130 decompresses, using the lossless algorithm, the obtained LLCRF and the set of required parameters. Then the decoder of the requiring MRE 130 is loaded with the decompressed reference frame and the set of required parameters. Thus, the decoder has the same reference frame as the reference frame M−1 and the same set of required parameters of the other receiving MRE 130. The encoder of the presenting MRE 130 can encode the next camera frame based on the reference frame M−1 and send the resulted Inter frame to the receiving MREs 130 including the requiring MRE 130. In addition, the encoder of the requiring MRE 130 may delete all previous reference frames.

Another embodiment may use a combination of the above disclosed techniques. Such an embodiment may use the temporary stream starting with an Intra frame in the same resolution as the normal stream but with lower quality, followed by few quality enhanced frames. In a typical videoconferencing session, the changes between consecutive frames are minimal, therefore after the few quality enhanced frames, the next uncompressed frame at the input of the encoder of the temporary stream is quite similar to the reference frame created after encoding the previous frame. In such embodiment, the presenting MRE 130 may compress the differences between the reference frames of the normal and temporary streams using a lossless compression technique and send the compressed differences to the requiring MRE 130. The requiring MRE 130 may decompress the differences and accordingly correct its decoder reference frame.

Compressing the same frame using a lossless compression technique by the encoders of both streams will generate the same reference frame in the encoders and the decoders of both streams, consequently the next frame can be compressed by the normal encoder, and the normal stream can be transmitted to the requiring MRE 130 as well as to the other receiving MREs 130.

In one embodiment, the MRM 120 controls the activity associated with the temporary stream by instructing the presenting MRE 130, as disclosed above. In other embodiments, the MRM 120 may just initiate the process, by allocating a channel for carrying the temporary stream between the presenting MRE 130 and the MRM 120. From that point, the MRE 130 is configured to execute automatically the entire process starting with a low quality Intra and terminating with the SSPn, then closing the extra channel for the temporary stream. In an alternate embodiment, the MRM 120 may start the process but the presenting MRE 130 and the requiring MRE 130 may negotiate when to move from one process to the other along the temporary stream.

In some embodiments, the encoder that is allocated to create the temporary stream can be a separate encoder than the encoder of the normal stream. The separate encoder can have an access to the reference memories of the normal stream encoder. Further, the separate encoder can lead the normal encoder during the transition period and instruct it when to execute the special encoding with the changed order between the actions of the encoder. In other embodiments, a single encoder can be configured to create both streams.

The MRE 130 can decode the received relayed RTP compressed video streams of data chunks of the video images received from the selected conferees and display each image in the appropriate layout segment. MRE 130 can decode the received relayed RTP compressed audio streams of audio data chunks, mix the different decoded audio streams and transfer the mixed audio to the MRE 130 loudspeakers. In the other direction, the MRE 130 can deliver relay RTP compressed audio and video data chunks according to the instructions from the MRM 120.

In addition to the above functionality of an MRE 130, a presenting MRE 130 that sends a normal stream of compressed video to the MRM 120 to be relayed to two or more receiving MREs 130 may respond to an Intra request related to a requiring MRE 130 in a novel way. In one embodiment, in which the encoders and the decoders store and use a plurality of previous reference frames, then instead of encoding an Intra frame and sending it as a next frame in the normal stream to the MRM 120 to be relayed to the two or more involved MREs 130, the presenting MRE 130 may respond by providing an Inter frame to all of the involved MREs 130. The provided Inter frame is encoded based on an identical reference frame (IRF) that exists in all the MREs 130 that are involved with that stream of compressed video. The encoded Inter frame is sent toward the involved MREs 130 and then the encoder releases all previously stored reference frames. The decoders of the requiring MRE 130 and the other receiving MREs 130 can decode the provided encoded Inter frame based on the previously stored copy of the IRF.

In one embodiment of an MRE 130, in which the encoders and the decoders use a plurality of previous reference frames for encoding/decoding a current frame, the encoder of the presenting MRE 130 may be informed that a previous reference frame exists in the decoder of the requiring MRE 130. The encoder may use this reference frame as an IRF, which is identical to a reference frame that also exists in the other receiving MREs 130. The next video image received from camera of the presenting MRE 130 can be compressed as an Inter frame based on the IRF and the rest of the previous reference frame of the encoder of the presenting MRE 130 can be released.

In some embodiments, a presenting MRE 130 may establish a temporary connection with the MRM 120 for carrying a novel temporary stream of compressed video in parallel to the normal stream. The temporary stream can be relayed by the MRM 120 to the requiring MRE 130. The temporary stream is used to prepare the decoder of the requiring MRE to receive and decode a future Inter frame that belongs to the normal stream, which is sent to the other receiving MREs 130 as well. The temporary stream and the normal stream have the same resolution. However the temporary stream may start with a low quality Intra frame and the quality can be improved from an Inter frame to the following Inter frame.

In order to switch from the temporary stream to the normal stream the presenting MRE 130 may encode a next video image received from the camera as an SP frame of the normal stream and encode the corresponding frame of the temporary stream as an SSP frame. The result of decoding the SP and the SSP frames may generate an IRF in the decoders of the other receiving MREs 130 as well as the requiring MRE 130 respectively. The reference frame of the normal encoder is also identical to the IRF. Thus the next video image received from the camera can be encoded based on the IRF and be send over the normal stream to all the involved MREs 130, including the requiring MRE 130. In one embodiment, frames of the temporary stream can be created from encoding the reference frame of the normal stream. In yet another embodiment, both streams can be created from encoding the video image received from the video camera of the presenting MRE.

Yet another embodiment of the disclosed system may respond to a need for an Intra frame by establishing a temporary connection for carrying a temporary stream, in parallel to the one or more normal streams. The temporary stream is created by a lossless compression of a reference frame that was created while encoding a recent frame of the normal stream. The temporary connection can be opened out of band, over an IP connection from the presenting MRE 130 to the requiring MRE 130 via the MRM 120, for example. Sending the lossless compressed reference frame (LLCRF) can be done in few packets and can take one or more frame intervals. The lossless compression method can be ZIP, Lempel-Ziv-Welch (LZW), lossless JPEG 2000, etc. In addition to sending the LLCRF, the presenting MRE 130 may send required parameters for decoding, such as a "picture parameter set" or a "sequence parameter set," as disclosed in the H.264 compression standard.

One embodiment may use a combination of the above disclosed methods. In such an embodiment, the presenting MRE 130 may start a temporary stream with an Intra frame in the same resolution as the normal stream but with lower quality, followed by a few quality enhanced frames. After a few quality enhanced frames, the reference frame at the encoder of the temporary stream is similar to the reference frame at the encoder of the normal stream. At this point of time, the difference between the reference frames of the two encoders can be calculated and be compressed in a lossless compression method. That compressed difference can be transmitted to the requiring MRE 130. At the requiring MRE 130, the lossless compressed difference can be losslessly decompressed and added to the reference frame at the decoder of the requiring MRE 130, creating an IRF at the decoder of the requiring MRE 130 as well as the decoders of the other receiving MREs 130. At this point of time, the temporary stream can be terminated and the normal stream can be transmitted toward the requiring MRE 130, as well.

Another embodiment may use a combination of the above disclosed methods. In such an embodiment, the presenting MRE 130 may start a temporary stream with an Intra frame in the same resolution as the normal stream but with lower quality, followed by few quality enhanced frames. After few quality enhanced frames, the next uncompressed frame received from the camera of the presenting MRE 130 at the input of the encoder of the temporary stream, is quite similar to the reference frame created after encoding the previous frame. In such an embodiment, the encoder of the normal stream and the encoder of the temporary stream may compress the differences between the next frame and the reference frame in a lossless compression method.

Compressing the same frame in a lossless compression method by the encoders of both streams at the presenting MRE 130 will generate the same reference frame in the encoders and the decoders of both streams, consequently the next frame can be compressed by the normal encoder of the presenting MRE 130 and a single stream, the normal stream, can be transmitted toward the MRM 120, which distributes it to the requiring MRE 130 as well as to the other receiving MREs 130. The lossless compression of the normal stream and the temporary stream may be done by bypassing the quantizer module in both encoders and decoders. More detailed information on the MRE 130 is disclosed below in conjunction with FIG. 11B.

In another embodiment, the novel MRM 120 may be configured to initiate the process of handling the request for an Intra frame from a presenting MRE 130 by a requiring MRE 130 and the rest of the activity may be managed by the presenting MRE 130 and the requiring MRE 130.

In yet another embodiment in which multicast is used, the MRM 120 can instruct a requiring MRE 130 to listen to a new multicast address as long the temporary stream is used and then listen to the multicast address that is associated with the normal stream. In parallel, the MRM 120 may instruct the presenting MRE 130 to start generating the temporary stream and send it to the new multicast address in parallel to sending the normal stream to the multicast address associated with the normal stream. More detailed information on the MRM 120 is disclosed below in conjunction with FIGS. 2, 3, 4, 8A, and 8B.

Figure 2:
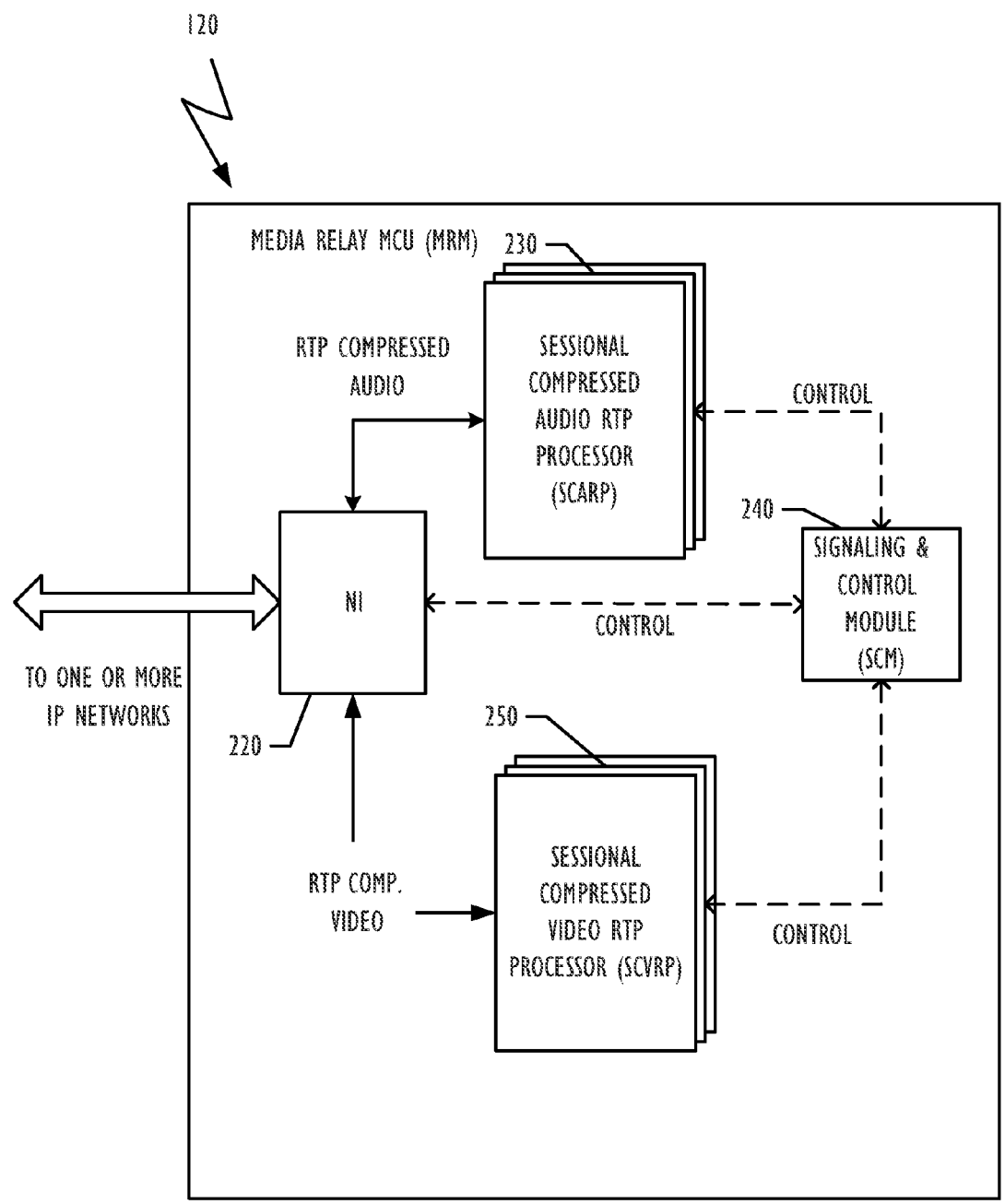
FIG. 2 is a block diagram with relevant elements of a Media Relay MCU (MRM), according to one embodiment

FIG. 2 depicts a block diagram with relevant elements of an MRM 120, according to one embodiment. The MRM 120 may include a Network Interface module (NI) 220, one or more Session Compressed Audio RTP Processor (SCARP) 230, a Signaling and Control Module (SCM) 240, and one or more Session Compressed Video RTP Processor (SCVRP) 250, for example. In an alternate embodiment the MRM 120 may include one or more SCMs 240 per each session.

A network interface module (NI) 220 can communicate with a plurality of video conferencing devices such as MREs 130 via network 110. Network interface 220 can parse the communication according to one or more communication standards such as H.323 and SIP. Furthermore, the network interface module 220 (NI) may process the physical layer, data link layer, network layer and the transport layer (UDP/TCP layer) of the received communication. NI 220 can receive and transmit control and data information to/from MRM 120 and MREs 130 or other nodes (not shown in the drawings).

NI 220 multiplexes/demultiplexes the different signals and streams communicated between the MREs 130 and the MRM 120. RTP chunks of compressed audio can be transferred via NI 220 to and from the MREs 130 and the SCARPs 230. Each SCARP 230 can be associated to a certain session. NI 220 can determine which session an MRE 130 is taking part in according to the MRE 130 packet's source and/or destination IP port and IP address and/or ID, thus enabling the NI 220 to determine which SCARP 230 should receive the RTP chunks of compressed audio received from a certain MRE 130. In the other direction, RTP chunks of compressed audio received from the SCARP 230 can be converted into IP packets by the NI 220 and transferred toward the appropriate MRE 130 or other nodes.

RTP compressed chunks of video data are transferred via NI 220 to and from MREs 130 and SCVRPs 250. Each SCVRP 250 can be associated with a video conferencing session. NI 220 can determine which session an MRE 130 is taking part in according to the MRE 130 packet's source and/or destination IP port and IP address and/or source ID, thus enabling the NI 220 to determine which SCVRP 250 should receive packets received from a certain MRE 130. In the other direction, RTP chunks of compressed video received from the SCVRP 250 can be converted into IP packets by the NI 220 and transferred toward the appropriate MRE 130 or other nodes.

NI 220 can also transmit and receive signaling and control data to and from SCM 240 and MREs 130. NI 220 may also handle the signaling and control of the process of responding to the need for an Intra frame to be sent from a presenting MRE 130 to a requiring MRE 130.

For each conferencing session handled by the MRM 120, a SCARP 230 can be allocated to handle the session audio. A SCARP 230 can receive via NI 220 relay RTP compressed chunks of audio data (headers and payloads) from MREs 130 that are taking part in the session. The SCARP 230 can manage a plurality of MRE sequential memories, one for each MRE 130 taking part in the session. The SCARP 230 can parse the RTP header of a received relay RTP compressed audio chunk from an MRE 130 and store the chunk in the appropriate MRE sequential memory. The SCARP 230 can also determine, according to a sequence number or a time stamp embedded in the relay RTP header, the appropriate order to store the relay RTP compressed audio chunks in the MRE sequential memory.

SCARP 230 can collect information on the audio energy of each MRE 130. In one embodiment the audio energy can be obtained by parsing the appropriate field in the relay RTP header of each received relay RTP compressed audio chunk. In yet another embodiment the audio energy can be obtained by sampling the audio energy levels of received relay RTP compressed audio chunks.

Periodically, typically each several tens of milliseconds, SCARP 230 can select a group of relay RTP compressed streams of audio chunks to be heard and thus transmitted to the MREs 130. The selection can be based on comparing the audio energies associated with the received streams. The number of selected relay RTP compressed streams depends on the audio mixing capabilities of the MREs 130. SCARP 230 can also select which MRE 130 is the main speaker (the one that will be displayed in the largest layout segment, for example) and accordingly forward signaling and control information to the SCM 240. The main speaker can be the one with the highest audio energy for a certain percentage of the heard-streams-selection intervals over a period of time.

In yet another alternate embodiment, SCARP 230 can forward the information on the audio energies of the MREs 130 to the SCM 240. The SCM 240 will select the MRE 130 main speaker and group of RTP compressed streams of audio data that will be heard (mixed), and send signaling and control data to the appropriate SCARP 230 and SCVRP 250. In some embodiments, information on the selected group of conferees and/or main speaker is also transferred to the MREs 130. According to signaling and control data sent from SCM 240, SCARP 230 can arrange the relay RTP compressed audio chunks of the selected group and relay them to the appropriate MREs 130 via the NI 220 as relayed compressed audio data chunks. More information about the SCARP 230 is disclosed below in conjunction with FIG. 3.

For each video conferencing session that MRM 120 handles, a SCVRP 250 is allocated. A SCVRP 250 can receive via NI 220 streams of relay RTP compressed video chunks (headers and payloads) from MREs 130 which are taking part in the session. The SCVRP 250 can manage a plurality of MRE sequential memories, one for each MRE 130 taking part in the session. The SCVRP 250 can parse the header of the received relay RTP compressed video chunks and store it in the appropriate MRE sequential memory according to its frame number or time stamp. From time to time, depending on the frame rate used by the session, according to signals and control information received from the SCM 240, the SCVRP 250 can access a group of the one or more MRE sequential memories and relay via the NI 220 the data of the group of selected MREs 130 toward the appropriate MREs 130.

During a transition period, the SCVRP 250, in addition to its normal operation, may allocate an additional sequential memory. The additional sequential memory can be used for storing the temporary stream received from a presenting MRE 130 and is targeted toward a requiring MRE 130, in parallel to the regular one or more streams received from that presenting MRE 130. Further, this temporary memory can be drained toward the requiring MRE 130 instead of one of the regular streams having the similar quality level. More information about the SCVRP 250 is disclosed below in conjunction with FIG. 4.

The SCM 240 controls the operation of a session. The SCM 240 may initiate conferencing sessions (reserved or impromptu), set the connections with the endpoints, determine conference properties, and set the EPs transmit and receive media accordingly. The SCM 240 may further allocate resources, allocate IDs, instruct the encoder of the endpoint to use a plurality of reference frames, etc. From time to time, the SCM may select a new speaker based on audio energy and video sources to be sent to each endpoint together with an indication of the speaker conferee. The new selection can be transferred to the SCARP 230 and the SCVRP 250 accordingly. The SCM 240 may instruct the EP to send the appropriate video parameters according to the changes in the layout.

The SCM 240 may determine which RTP compressed streams of video data are relayed to which MREs 130 and in which layout segment the video images are presented. Based on instructions received from the SCM 240, the SCVRP 250 relays the appropriate streams to MREs 130 and may instruct the MRE 130 in which layout segment to present each of the video images. In one embodiment, the SCVRP 250 can notify the MREs 130 of changes in the presentation of conferees by changing the ID in the RTP headers of the relayed RTP compressed video data chunks that it sends. The changed ID in the header can be used as an indication to the receiving MRE 130 specifying in which segment in the CP image the relayed RTP compressed video data chunks should be displayed. In an alternate embodiment, the SCM 240 can notify the MREs 130 about the changes, via the NI 220, by signaling and control data. In yet another embodiment, the SCVRP 250 can notify the MREs 130 about the changes by setting a predefined field in the RTP headers of the relayed RTP compressed video data chunks that it sends. The predefined field in the RTP header can be used to indicate in which segment the MRE 130 should display the relayed RTP compressed video data chunks.

In addition to the above activities, the SCM 240 may handle the transition and switching period. It may respond to an Intra request from one MRE 130 out of the receiving MREs 130. It may determine the reason for the request, for example whether the request for an Intra is due to changes in the layout or due to a new participant joining the conference. The SCM 240 manages the temporary connection for carrying the unique stream from the presenting MRE 130. Some embodiments of an MRM 120 may respond to an Intra request as follows: the SCM just initiates the transition period and the presenting MRE 130 and the requiring MRE 130 manage the number of temporary low quality frames and when to switch back to the regular stream. More information on MRM 120 is disclosed below in conjunction with FIGS. 3, 4, 8, and 11.

Figure 3:
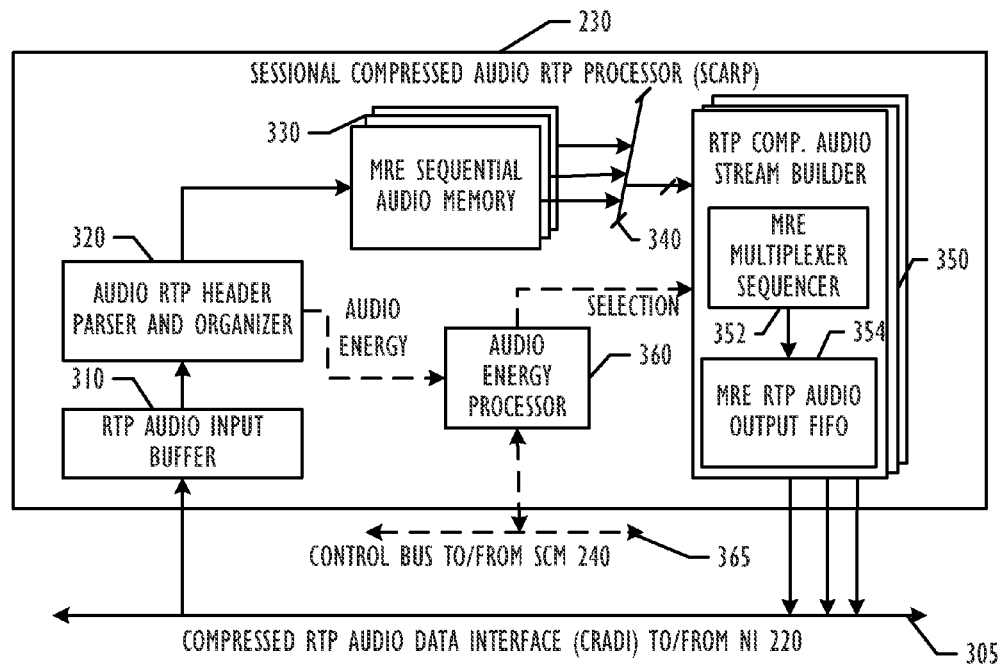
FIG. 3 is a simplified block diagram with relevant elements of a session compressed audio RTP processor according to one embodiment.

FIG. 3 illustrates a simplified block diagram with relevant elements of a SCARP 230 that implements techniques and elements of various embodiments. The SCARP 230 may include an RTP audio input buffer 310, an audio RTP header parser and organizer 320, a plurality of MRE sequential audio memories 330, a bus 340 that can be an internal bus or a shared memory, a plurality of RTP compressed audio stream builders 350, and an audio energy processor 360. The SCARP 230 can be controlled by the SCM 240 via a control bus 365, which can be an internal bus or a shared memory, for example. The SCARP 230's input and output can be connected to NI 220 via a compressed RTP audio data interface (CRADI) 305 for receiving and transmitting compressed audio data chunks. The CRADI 305 can be an internal bus or a shared memory.

Each SCARP 230 can be assigned to handle the audio of a conference session handled by the MRM 120. A SCARP 230 RTP audio input buffer 310 can obtain relay RTP compressed audio data chunks from the CRADI 305. The relay RTP compressed audio data chunks are received from the MREs 130 that participate in the session. In one embodiment, the RTP audio input buffer 310 can determine which relay RTP compressed audio data chunk to obtain from the CRADI 305 by using the ID number in the relay RTP header. In an alternate embodiment, the RTP audio input buffer 310 can receive the relay RTP compressed audio data chunk from the NI 220 based on the source and/or destination IP address and port number of the received relevant packet.

An audio RTP header parser and organizer 320 can extract the relay RTP compressed audio data chunks from the RTP audio input buffer 310, and parse the header of the relay RTP compressed audio data chunks for retrieving relevant information such as: the ID, the sequence number and/or the time stamp of the chunks, and the audio energy, if it exists. In some embodiments, the audio header can be parsed in order to retrieve the audio energy information. Based on the ID, for example, the audio RTP header parser and organizer 320 can transfer the parsed relay RTP compressed audio data chunk to the appropriate MRE sequential audio memory 330 and the audio energy to the audio energy processor 360.

Each MRE sequential audio memory 330 can be associated with an MRE 130 (FIG. 1). Received relay RTP compressed audio data chunks from the associated MRE can be stored in the MRE sequential audio memory 330 according to their sequence number and/or time stamp. Each MRE sequential audio memory 330 can be accessed via the bus 340, which connects all MRE sequential audio memories 330 with one or more of the RTP compressed audio stream builders 350.

Each RTP compressed audio stream builder 350 can be assigned to one or more MREs 130. An RTP compressed stream builder 350 can comprise an MRE multiplexer and sequencer 352 and an MRE RTP audio output buffer 354. The RTP compressed stream builder 350 can select a group of one or more sources of compressed audio relay data chunks by accessing one or more MRE sequential audio memories 330. The group selection can be based on different parameters such as control signals received from audio energy processor 360, user specification of a specific source independent of its energy, or the audio mixing capabilities of the destination MRE 130. Usually the group of the selected sources does not include the audio stream received from the destination MRE 130. In an alternate embodiment, the RTP compressed stream builder 350 can receive control signals from the destination MRE 130 regarding which MREs 130 to select. Furthermore, from time to time the RTP compressed audio stream builder 350 can change its selection of inputs according to real-time changes in the conference.

An MRE multiplexer sequencer 352 can select one or more input relay RTP compressed audio data chunks streams from bus 340. The selected relay RTP compressed audio data chunks streams can be multiplexed into one relayed RTP compressed audio data chunks stream, which is sent to the MRE RTP audio output FIFO 354 and from there is transmitted toward the appropriate MRE 130 via the CRADI 305 and the NI 220.

An alternate embodiment (not shown in the drawing) of the RTP compressed audio stream builder 350 can include a group of selectors. Each selector is connected to the bus 340 and can select the output of one of the MRE sequential audio memories 330. The other port of the selector can be connected via FIFO to the CRADI 305. In such an embodiment, the selected audio streams are sent toward the MREs 130 as a plurality of relayed RTP compressed audio data chunks streams.

In an alternate embodiment, an RTP compressed audio stream builder 350 can be used to serve a group of conferees that participate in a conference session, wherein all relevant MREs 130 will receive the same stream of relayed RTP compressed audio data chunks.

An audio energy processor 360 can receive audio energy associated with each relay RTP compressed audio data chunk and based on this information the audio energy processor 360 determines which MRE 130 will be selected to be mixed in the next time period and the selection is transferred to MRE multiplexer sequencer 352 of the appropriate RTP compressed audio stream builder 350. Furthermore, the audio energy processor 360 can determine which endpoint should be presented as the main speaker as described above. This information specifying a new active speaker can be delivered to the SCM 240 via the control bus 365.

Figure 4:
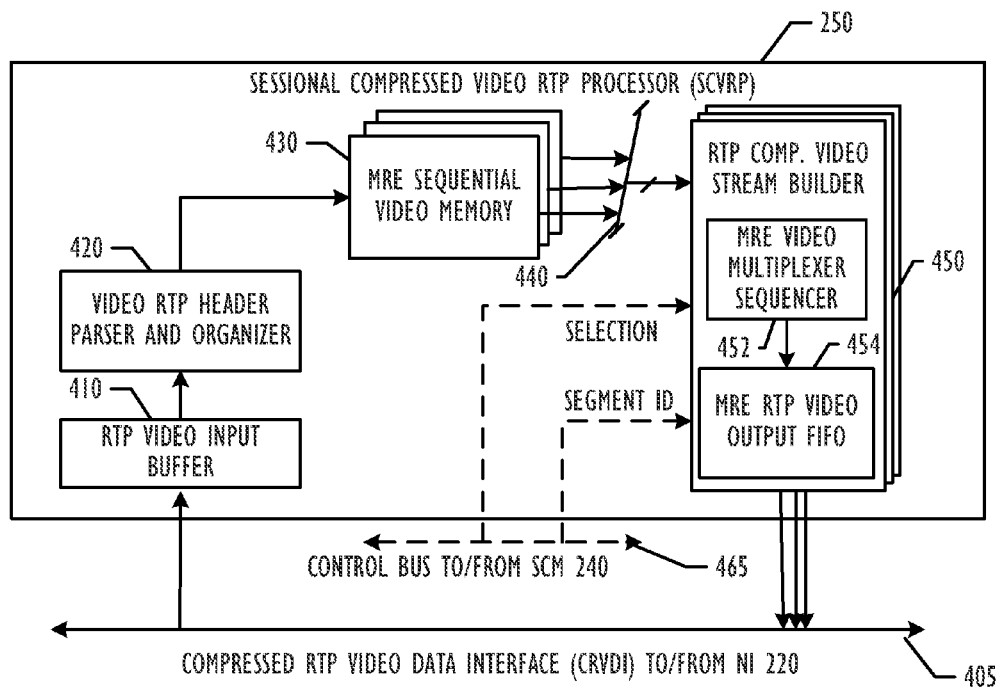
FIG. 4 is a simplified block diagram with relevant elements of a session compressed video RTP processor according to one embodiment.

FIG. 4 is a simplified block diagram with relevant elements of an SCVRP 250 that implements techniques and elements of various embodiments. An SCVRP 250 can comprise an RTP video input buffer 410, a video RTP header parser and organizer 420, one or more MRE sequential video memories 430, a bus 440 that can be an internal bus or a shared memory, for example, and one or more RTP compressed video stream builders 450. The SCVRP 250 can receive control from an SCM 240 via a control bus 465, which can be an internal bus or a shared memory, for example. Compressed input and output video data chunks can be communicated between the SCVRP 250 and the NI 220 via a compressed RTP video data interface (CRVDI) 405, which may be an internal bus, or a shared memory, for example.

Each SCVRP 250 manages the video of a conference session. An RTP video input buffer 410 can obtain, via the CRVDI 405 from the NI 220, the relay RTP compressed video data chunks received from the MREs 130 that participate in the session. In one embodiment, the RTP video input buffer 410 can determine which relay RTP compressed video data chunk to handle by the ID number embedded in the RTP header, for example. In an alternate embodiment, the RTP video input buffer 410 receives the video chunks from the NI 220 based on the source and/or destination IP address and port number associated with the relevant packet.

The video RTP header parser and organizer 420 can extract the relay RTP compressed video data chunks from the RTP video input buffer 410 and parse the header of the relay RTP compressed video data chunks for retrieving relevant information such as: the ID, the sequence number and/or time stamp and/or frame number with the first macro block address (MBA) associated with each video chunk. Based on the retrieved information, the video RTP header parser and organizer 420 can store the relevant relay RTP compressed video data chunk in the appropriate MRE sequential video memory 430.

Each MRE sequential video memory 430 is associated with a stream received from an MRE 130 taking part in the session. Each stream received from an MRE 130 can carry compressed video in a different quality level and/or resolution. Each output of the MRE sequential video memory 430 is linked to the bus 440, which connects all the MRE sequential video memories 430 with one or more of the RTP compressed video stream builders 450.

During a transition period, an SCM 240 can allocate an additional temporary MRE sequential video memory 430 that will be assigned to the temporary stream that will be sent from the presenting MRE 130. In addition, the video RTP header parser and organizer 420, the RTP video input buffer 410, and the NI 220 can be informed with the ID of the temporary stream in order to route it to the temporary MRE sequential video memory 430.

Each RTP compressed video stream builder 450 can be assigned to one or more receiving MRE 130 for selecting a group of appropriate relay compressed video data streams to be relayed to the MRE 130. An RTP compressed video stream builder 450 can comprise an MRE multiplexer sequencer 452 and an MRE RTP video output buffer 454. Each RTP compressed video stream builder 450 can select a group of one or more sources (MREs 130) of the relay RTP compressed video data chunks and a group of one or more MRE sequential video memory 430. This selection can be based on control signals received from the SCM 240 via control bus 465 and can be changed as a result of changes in the session. In an alternate embodiment, the RTP compressed video stream builder 450 can receive control signals from the assigned MRE 130 itself via the SCM 240 and the control bus 465 regarding which MREs 130 the assigned MRE 130 would like to see.

An MRE video multiplexer sequencer 452 can obtain the selected streams of input relay RTP compressed video data chunks from the bus 440 and multiplex the group of streams into one stream of relayed RTP compressed video data chunks, which is stored in the MRE RTP video output FIFO 454 and from there is transmitted toward the assigned receiving MRE 130 via CRVDI 405 and NI 220. In some conference sessions, one RTP compressed video stream builder 450 can be used for all the MREs 130 of the session, thus all MREs 130 will receive the same stream of relayed RTP compressed video data chunks.

An alternate embodiment (not shown in the drawing) of the RTP compressed video stream builder 450 can comprise a group of selectors. Each selector is connected to the bus 440 and can select the output of one of the MRE sequential video memories 430. The other port of the selector can be connected via FIFO to the CRVDI 405. In such an embodiment, the selected video streams are sent toward the MREs as a plurality of relayed RTP compressed video data chunks streams.

In yet another embodiment, an exemplary MRE sequential video memory 430 may not organize the received relay RTP compressed video data chunks according to their sequence numbers. Instead, the received relay RTP compressed video data chunks are organized according to the order of receiving them.

In one embodiment, in which an ID number is assigned to each segment in a layout, the MRE RTP video output FIFO module 454 can be adapted to add the appropriate segment ID to each handled compressed video data chunk. In such an embodiment, the association between a segment ID and a relevant ID of the source MRE 130 can be maintained via the control signal received via the bus 465. The segment ID can replace the source ID that was associated with the chunk or it can be stored in another field in the RTP header.

During a transition period, an SCM 240 can instruct the RTP compressed video stream builder 450 that is assigned to the requiring MRE 130 to obtain the compressed video data chunk from the temporary MRE sequential video memory 430 that is assigned to the temporary stream instead of the MRE sequential video memory 430 that is assigned to the stream that is sent from the presenting MRE 130. The RTP compressed video stream builders 450 that are assigned to the rest of the receiving MREs may continue draining the MRE sequential video memory 430 that is assigned to the stream sent from the presenting MRE.

Figure 5:
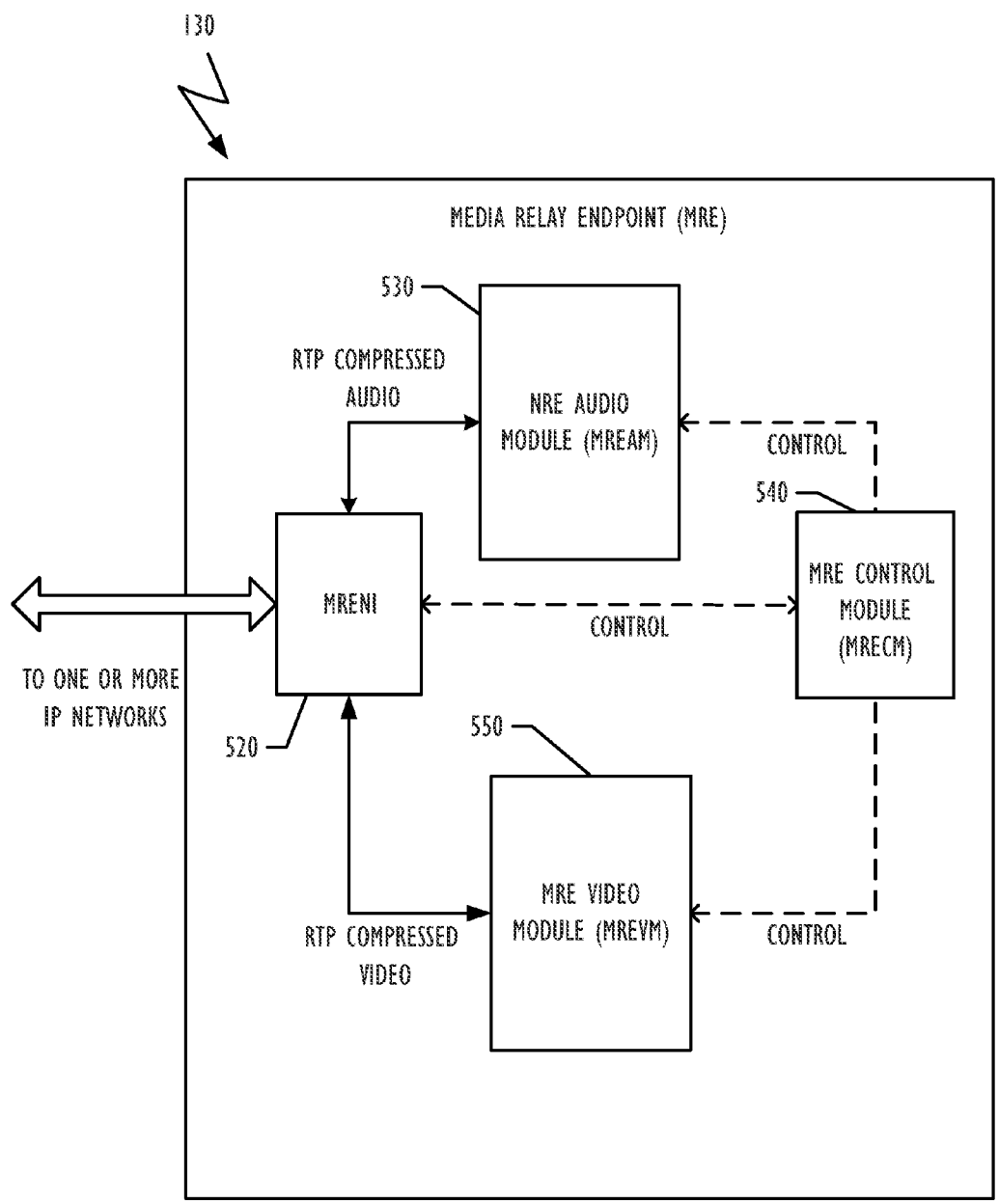
FIG. 5 is a simplified block diagram with relevant elements of a Media Relay Endpoint (MRE), according to one embodiment.

FIG. 5 depicts a simplified block diagram with relevant elements of one embodiment of a MRE 130. The MRE 130 may include an MRE Network Interface module (MRENI) 520, an MRE Audio Module (MREAM) 530, an MRE Control Module (MRECM) 540, and an MRE Video Module (MREVM) 550.

An MRE 130 can communicate via the MRENI 520 with the MRM 120 or another MRE 130 via network 110. An MRENI 520 can process the communication according to one or more communication standards such as H.323, SIP or similar standards and compression standards such as H.264, MPEG, etc. Furthermore, the network MRENI 520 may perform the physical layer, data link layer, network layer and transport layer (UDP/TCP layer) of the communications to and from the MRE 130.

MRENI 520 can multiplex/demultiplex the signal and control as well as media streams communicated between the MRE 130 and MRM 120. RTP compressed data chunks of audio and video (header and payloads) are transferred to and from the MRM 120 and the MREAM 530 and the MREVM 550, respectively, via the MRENI 520. The MRENI 520 can also transmit and receive signaling and control between the MRECM 540 and the MRM 120.

An MREAM 530 can receive a group of a plurality of relayed RTP compressed audio data chunks (header and payloads) from the MRM 120 via the MRENI 520, and parse the RTP header of the relayed RTP compressed audio data chunks to determine parameters such as source ID, time stamp and sequence number. The MREAM 530 can also arrange the received relayed RTP compressed audio data chunks according to their ID, time stamp and/or sequence number and then decode, mix, and amplify the audio data chunks. The, MREAM 530 can transfer the mixed audio to one or more loudspeakers of the MRE 130.

In the other direction, the MREAM 530 can collect audio signals from the MRE 130's microphones and transform the signals from analog to digital, calculate the audio energy, and encode/compress the audio according to the appropriate compression standards into RTP compressed audio data chunks. The compression standard used can include G.711, G.719, or G.722.1C.

The MREAM 530 can embed the calculated audio energy, the ID assigned to the audio stream of the MRE 130 by the MRM 120, the time stamp, and the sequential number in the appropriate field of the RTP header of the compressed audio data chunks. In another embodiment, the MREAM 530 can send the indication of the audio signal energy via an MRECM 540. More information regarding the MREAM 530 is disclosed below in conjunction with FIG. 7.

An MREVM 550 can receive a group of relayed RTP compressed video data chunks (header and payloads) from the MRM 120 via the MRENI 520 and parse the RTP header of the received relayed RTP compressed video data chunks in order to determine parameters such as source ID, segment ID, time stamp and sequence number. During a transition period an ID number can be allocated to the temporary stream. The MREVM 550 can arrange the received relayed RTP compressed video data chunks according to their time stamp and/or sequence number, decode the relayed RTP compressed video data chunks, and organize them into an appropriate segment FM (frame memory) based on the ID number. For each segment in the layout there can be a segment FM and each segment and/or source ID can be associated to a certain segment FM in the layout. In an alternate embodiment, the source and/or destination IP address and port number can be associated to a segment in the layout. Depending on the frame rate used by the MRE 130, the MREVM 550 can combine the different segment FMs into a composed FM (CP FM) and send the completed CP FM to be displayed over one or more displays of the MRE 130.

In an alternate embodiment, MREVM 550 can arrange the received relayed RTP compressed video data chunks according to their time stamp and/or sequence number, decode the video data chunks, and organize them into one CP FM that covers the whole layout. In another embodiment, the MREVM 550 can also receive information from the MRECM 540 regarding changes in the conference main speaker, changes in the number of conferees to be presented, changes of some of the conferees, etc.

In some embodiments the decoder of the MREVM 550, which decodes the received relayed RTP compressed video data chunks, can be configured to handle the decoding process during the transition period. In one embodiment, the decoder may store and use a plurality of previous reference frames. In such an embodiment, the decoder may send an Intra replacement request with an indication of the last stored previous reference frame. In other embodiments the decoder can process unique frames such as SP and SSP frames. In yet other embodiments, the decoder can be adapted to decode a lossless compressed frame in order to load it as a reference frame for the following Inter frame, etc.

In the other direction, the MREVM 550 can collect video images from the MRE 130's camera, scale the video images into the one or more required sizes/quality, and encode/compress the video images according to the appropriate compression standards into RTP compressed video data chunks. The compression standard can include H.264, MPEG 4, etc. Information regarding the required size and compression standards can be received from the MRM 120 via an MRECM 540. The MREVM 550 can embed in the appropriate field in the RTP header different parameters such as source ID, time stamp, sequential number, frame number, etc. According to the frame rate, the relay RTP compressed video data chunks are transferred to an MRM 120 via the MRENI 520.

In some embodiments, the encoder of the MREVM 550, which encodes/compresses the relay RTP compressed video data chunks, can be configured to handle the encoding process during the transition period. In one embodiment, the decoder of a receiving MRE 130 may store and use a plurality of previous reference frames. In such embodiment, the encoder may receive an Intra replacement request from a requiring decoder, with an indication of the last stored previous reference frame the decoder has. Then, the encoder may respond by compressing the following video image from the camera compressed as an Inter frame based on the indicated last stored previous reference frame. In other embodiments the encoder can encode SP and SSP frames. In yet other embodiments, the encoder can be adapted to encode its reference frame according to a lossless compression method into a lossless compressed frame in order to be loaded as a reference frame in the decoder of the requiring MRE 130 for the following Inter frame, etc.

An MRE Control Module (MRECM) 540 can control the operation of the MRE 130. The MRECM 540 can establish connections with the MRM 120 and communicate parameters regarding the number of conferees in the layout that will be displayed over the MRE 130, image sizes, compression standards, main speaker, ID information, etc. ID information can include information on IDs for the different audio or video data chunks sent from the MRE 130, communication related a transition period, etc. The information related to the transition period can comprise an indication of starting and terminating the transition period, an ID for the temporary stream, signaling and control that is related to the transition period, etc.

The MRECM 540 can allocate audio and video resources according to the number of selected conferees in the session, the required layout, the number of required FMs, etc. The MRECM 540 can instruct the MREVM 550 how to construct the layout to be displayed in one or more displays of the MRE 130. The MRECM 540 can also update the MREAM 530 regarding the number of conferees to be mixed, etc. In some embodiments, an out of band connection can be established between the MRE 130 and the MRM 120 that will enable the MRE 130 and the MRM 120 to communicate changes dynamically in the session.

In some embodiments of the MRE 130, the MRECM 540 and the MREVM 550 may be adapted to add information to the displayed CP image. The information can indicate the current speaker and/or a conferee's name which is currently presented in each of the segments. In such an embodiment, the MRECM 540 can be adapted to receive the information from the MRM 120. The information can be transferred to the MREVM 550, which includes a text and graphic generator, for converting the status information to be displayed at the endpoint. In the other direction the MREVM 550 and the MRECM 540 can be adapted to display a menu from the endpoint, where the menu can be used for controlling the MRM 120.

During the transition period the MRECM 540 can be adapted to allocate video and network resources in the MREVM 550 and the MRENI 520 (respectively) for handling the temporary stream. In some embodiments, the MRECM 540 of the presenting MRE 130 and the requiring MRE 130 can be configured to manage the process of handling the transition period. The MRM 120 may initiate the transition period but after the initiation, the MRECM 540 of the requiring MRE 130 and/or the presenting MRE 130 can manage the continuation and termination of the transition period. More information on the MRE 130 is disclosed below in conjunction with FIGS. 6, 7, 9, and 9B.

Figure 6:
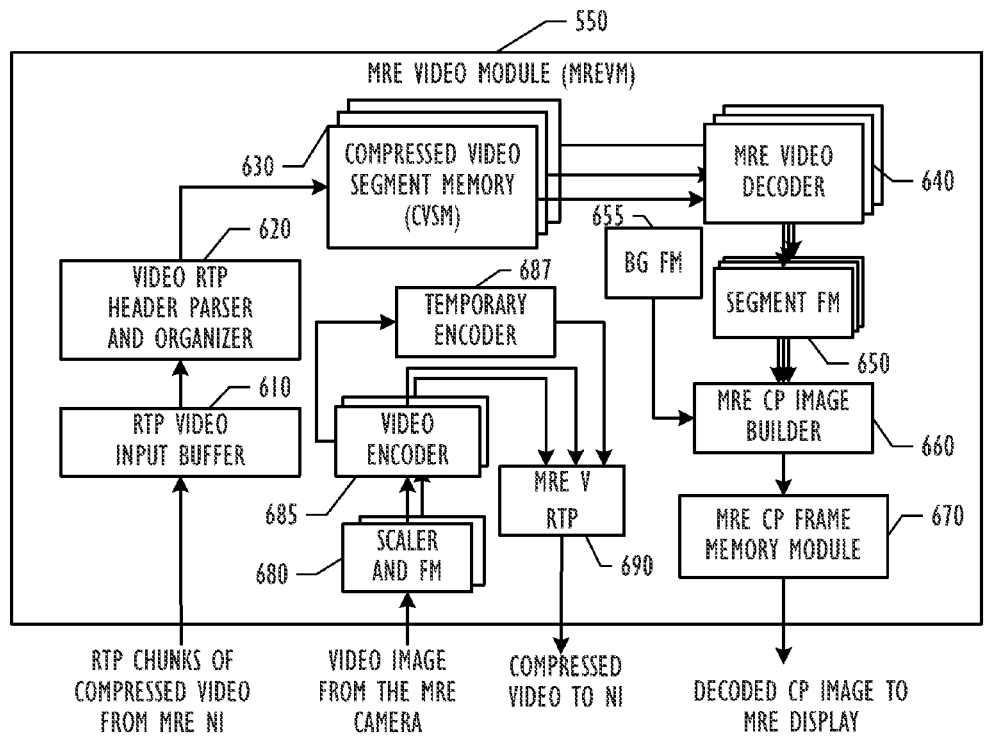
FIG. 6 is a simplified block diagram with relevant elements of a portion of an MRE Video Module (MREVM), according to one embodiment.

FIG. 6 depicts a simplified block diagram with relevant elements of a portion of an MREVM 550 according to one embodiment. MREVM 550 can have two main sections: (i) an input section, which can handle the received group of relayed RTP compressed video data chunks and (ii) an output section, which can handle the video data captured by an MRE 130 camera. An input section according to one embodiment can comprise modules such as an RTP video input buffer 610, a video RTP header parser and organizer 620, one or more Compressed Video Segment Memory (CVSM) 630 (one per each segment in the layout), one or more MRE video decoders 640 (one per each segment in the layout), one or more segment FMs 650 (one per each segment in the layout), an MRE CP image builder 660, an MRE CP frame memory module 670, and a background FM 655, for example. The output section can comprise one or more Scaler and FM 680, one or more video encoder 685, a temporary encoder 687, and an MRE video RTP processor (MREVRTP) 690, for example. The encoder 685 and the decoder 640 are capable of using compression standards such as H.264 AVC, H.264 annex G, MPEG-4, etc.

Each CVSM 630 is associated with an ID of a video stream that is to be presented in that segment. In one embodiment, a CVSM's association with an ID may vary during a session. In other embodiments, the association of CVSM and ID is fixed for an entire session.

An RTP video input buffer 610 of the input section of the MREVM 550 may obtain relayed RTP compressed video data chunks from MRENI 520. The Video RTP header parser and organizer 620 can access the input buffer 610 and parse the RTP header for determining different parameters of the received relayed RTP compressed video data. The parameters may include but are not limited to the sequence number, frame number, the source and/or segment ID, time stamp, etc. RTP header parser and organizer 620 may also have an index table that associates source IDs to segments in the displayed layout, for example. In an embodiment in which the segment ID is not associated with a received data chunk, each CVSM 630 can be associated with a certain segment in the displayed layout, for example. Thus, the RTP header parser and organizer 620 can transfer an appropriate stream of relayed RTP compressed video data chunks to a CVSM 630 according to source ID, for example. The RTP header parser and organizer 620 can also organize the RTP compressed video data chunks in the CVSM 630 according to the sequence number or time stamp or frame number and the address of the first MB of received data chunks.

Each CVSM 630's output can be associated with an MRE video decoder 640 and each MRE video decoder 640's output can be associated with a segment FM 650. Thus, the MRE video decoder 640 can access the appropriate CVSM 630, decode the RTP compressed video data chunks and store the decoded video in the appropriate segment FM 650. In an alternate embodiment, a scaler can be added between a decoder 640 and a segment FM 650. The MRE CP image builder 660 can transfer the contents of the different segment FMs 650 into the MRE CP frame memory module 670 to build a CP image. A complete frame of a CP image can be transferred from the MRE CP frame memory module 670 to be displayed on the MRE display unit. From time to time, the background FM 655 can be loaded based on different parameters, such as background color, border lines between the different segments and their color, pattern, and conferees' names. The background FM 655 can be created at the beginning of a session, but changed at any time during the session. In one embodiment of an MRE 130, the background can be created by the MRECM 540. While building the CP image, the MRE CP image builder 660 can collect data from the background FM 655 module as it is collected from the segments FMs 650.

During a transition period the input section of an MREVM 550 of a requiring MRE 130 may act differently than in normal operation. During the transition period, the RTP video input buffer 610 can be configured also to obtain the relayed RTP compressed video data chunks from the MRENI 520 that are related to the temporary stream received from the relevant presenting MRE 130. The Video RTP header parser and organizer 620 can be configured to obtain the relayed RTP compressed video data chunks of the temporary stream and organize them in the CVSM 630 that is associated to the segment allocated to the presenting MRE 130 in the CP image to be displayed on the requiring MRE 130's display.

In one embodiment the MRE video decoder 640, which is associated to the segment allocated to the presenting MRE 130, can be configured to use a plurality of stored previous reference frames. In such embodiment, the decoder can be configured to send an Intra replacement request together with the sequence number of a stored previous reference frame. In response the relevant encoder of the presenting MRE 130 may send an Inter frame that was compressed based on the indicated stored previous frame. The Inter frame can be send over the normal stream.

In another embodiment in which an SP frame is used over the normal stream and an SSP frame is used over the temporary stream, the decoder of the relevant stream 640 can be configured to handle the SP and/or the SSP frames for a receiving MRE 130 or a requiring MRE 130, respectively.

Yet in an alternate embodiment in which a reference frame is transferred by using a lossless compression algorithm from the encoder of the presenting MRE 130 over the temporary stream, the relevant decoder 640 can be capable of decoding the lossless compression algorithm used to encode the reference frame and load it into its reference frame in order to be capable of decoding the following frame of the normal stream that will be encode based on that reference frame.

Managing the transition period can be done by the relevant decoder 640 with the encoder of the presenting MRE 130. While in other embodiments the management can be handled by the SCM 240. In other embodiments the transition period activity of the decoder/encoder can be initiated by the SCM 240 upon starting the transition period and then the decoder 640 and the encoder of the presenting MRE 130 continue autonomously.

The output section of the MREVM 550 receives video images from the MRE 130 camera and stores the images in one or more Scaler and FM 680. Each Scaler and FM 680 can scale and store the video image into a different size (resolution), for example. The output of each Scaler and FM 680 is associated with a video encoder 685, which can encode the data at a different rate and/or quality resulting in compressed video data chunks. The video encoder 685 then transfers the compressed video data chunks to an MREVRTP 690, which can embed a source ID, time stamp, sequence number or other parameters into the headers of the RTP compressed video data chunks. Next, the MREVRTP 690 outputs the relay RTP compressed video data chunks to the MRENI 520.

During a transition period, the output section of an MREVM 550 of a presenting MRE 130 may act differently than in normal operation. During the transition period, one embodiment of the video encoder 685, which is associated with the scaler that scales to the size associated with the requiring MRE 130, can be configured to use a plurality of stored previously used reference frames. In such an embodiment, when the encoder receives an Intra replacement request from a requiring MRE 130 that is accompanied by the sequence number of a stored previous reference frame, the encoder may respond by encoding the next received camera frame from the relevant scaler and the FM 680 as an Inter frame based on the previously used reference frame. The Inter frame that was compressed based on the previous frame is sent over the normal stream via the MREVRTP 690. After sending that Inter frame, the encoder can delete all other stored previous reference frames.

In another embodiment in which an SP frame is used over the normal stream and an SSP frame is used over the temporary stream, a temporary encoder 687 can be allocated to create the temporary stream. In addition, the MREVRTP 690 can be adapted to handle the compressed chunks of the temporary stream. The temporary encoder 687 can obtain the same scaled frame from the relevant scaler and FM 680 that is allocated to the encoder 685 of the normal stream. The first compressed frame of the temporary stream can be encoded as an Intra frame in the same size but in lower quality than the normal stream. The quality of the temporary stream can be improved from one Inter frame to the other. After a few Inter frames (3 to 15 frames, for example), the temporary encoder 687 can transmit an SSP frame while the normal encoder 685 can transmit an SP frame. The next camera frame will be encoded as a normal frame by the relevant video encoder 685 and be sent toward the requiring MRE 130 over the normal stream as to all other receiving MREs 130.

In an alternate embodiment in which a reference frame is transferred by using a lossless compression algorithm from the encoder 685 of the presenting MRE 130 over the temporary stream, the temporary encoder 687 can be capable of obtaining a reference frame from the encoder 685 of the normal stream. The obtained reference frame can be compressed by the temporary encoder 687 using a lossless compression algorithm. The lossless compressed frame can be sent via MREVRTP 690 toward the requiring MRE 130 over a temporary stream or over an out of band IP connection. In an embodiment in which out of band connection is used the lossless compressed reference frame can be transferred from the temporary encoder 687 directly to the MRENI 520. A lossless algorithm can be ZIP, Lempel-Ziv-Welch (LZW), lossless JPEG 2000, etc.

Figure 7:
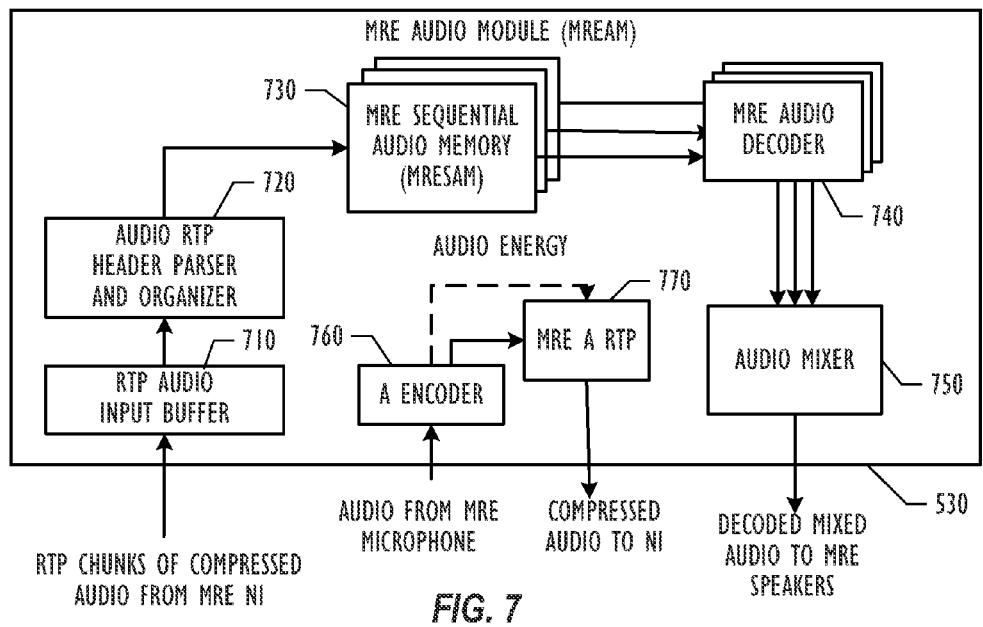
FIG. 7 is a block diagram illustrating relevant elements of a portion of an MRE Audio Module (MREAM), according to one embodiment.

FIG. 7 depicts a simplified block diagram with relevant elements of one embodiment of MREAM 530. MREAM 530 can have two sections: (i) the MREAM input section which can handle the MREAM 530 received group of input relayed RTP compressed audio data chunks, and (ii) the MREAM output section which can handle the audio data that will be output from MRE 130 toward the MRM 120, for example. An MREAM input section can comprise modules such as an RTP audio input buffer 710, an audio RTP header parser and organizer 720, one or more MRE Sequential Audio Memories (MRESAM) 730, one or more MRE audio decoders 740, and an audio mixer 750. The MREAM output section can comprise an encoder 760 and an MRE audio RTP processor 770, for example. In some embodiments, in which two receiving MREs 130 use different audio compression standards, the output section can comprise: two or more sets of an encoder 760 and an MRE audio RTP processor 770, each set can be associated with a compressed audio stream based on compression standard different than the other set, for example.

An RTP audio input buffer 710 may obtain the group of relayed RTP compressed audio data chunks from the MRM 120 via the MRENI 520. The audio RTP header parser and organizer 720 can access the input buffer 710, and parse the RTP header for determining parameters such as sequence number, the source ID, time stamp, etc. Each MRESAM 730 can be associated with a certain source MRE 130 taking part in the session and that has been chosen to be heard, for example. The RTP header parser and organizer 720 can transfer an appropriate stream of relayed RTP compressed audio data chunks to an MRESAM 730 according to the data chunks ID, for example. In an alternate embodiment, the RTP header parser and organizer 720 can transfer an appropriate stream of relayed RTP compressed audio data chunks to an MRESAM 730 according to the source IP address and port, for example. RTP header parser and organizer 720 can also organize the RTP compressed audio data chunks in each of the MRESAM 730 according to the sequence number or time stamp of the data chunks. Each MRESAM 730 output is associated with an MRE audio decoder 740, which accesses the MRESAM 730 and decodes the RTP compressed audio data chunks. The compression standards used by the decoder can be such as but not limited to G.719, G.7221.C, etc. The audio mixer 750 can receive the outputs of all MRE audio decoders 740, mix them, and output the mixed audio to the MRE 130 loudspeakers.

An output section of the MREAM 530 can receive audio from the MRE 130's microphones. The encoder 760 can collect the received input audio, determine its energy, and encode the input audio into compressed audio data chunks. The compression can be based on compression standards such as G.719, G.7221.C, etc. Next, the compressed audio data chunks are transferred to the MRE audio RTP processor 770. The indication on the audio energy can also be transferred to the MRE audio RTP processor 770, which can embed different parameters in the headers of the RTP audio data chunk. The parameters can include sequence number, source ID, time stamp, audio energy indication, and so on. Next, the MRE audio RTP processor 770 outputs the relay RTP compressed audio data chunks to MRENI 520 and from there to the MRM 120. In an alternate embodiment, the audio energy indication can be stored in the header of the compressed audio data chunk. In yet another embodiment, the audio energy can be transferred toward the MRM 120 over a signaling and control connection via the MRECM 540 and MRENI 520.

Figure 8A:
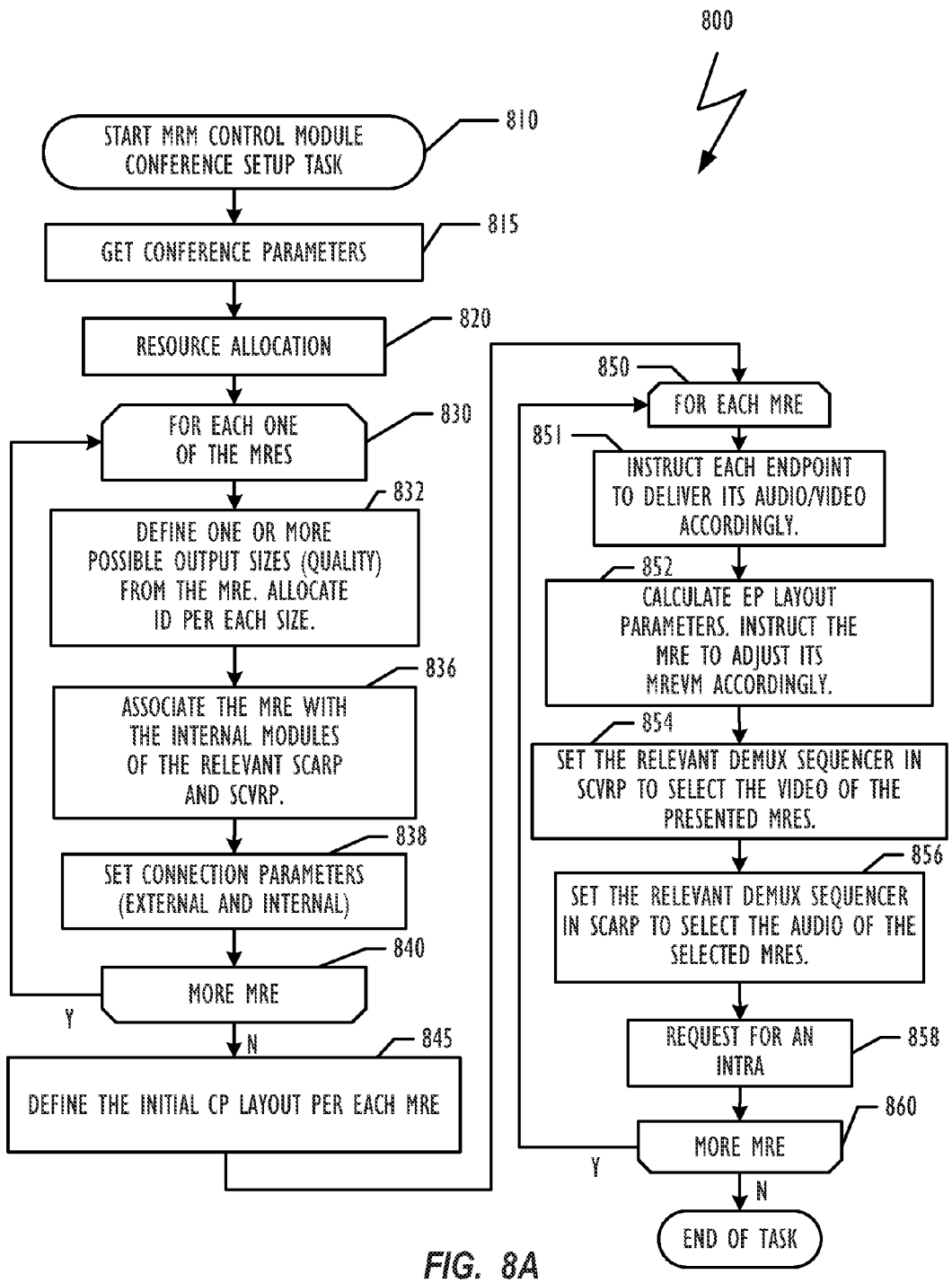
FIG. 8A is a flowchart illustrating relevant actions of a conference setup method according to one embodiment.

FIG. 8A is a flowchart illustrating relevant processes of a conference setup method 800 implemented by one embodiment of an SCM 240. Method 800 can be initiated by the MRM Control Module Conference setup process in action 810. At action 815 conference parameters such as the number of conferees (MREs 130), bit rate, the audio and video compression standards, as well as the number of previous reference frames that can be used for video encoding/decoding, CP layout etc. are collected. Next, the method 800 allocates various conference resources such as the NI 220 resources, an associated SCARP 230, an associated SCVRP 250, bandwidth, etc. at action 820. Then a loop between actions 830 and 840 is executed for each MRE 130 taking part in the conference. At action 832 one or more possible output image sizes (quality) from the MRE 130 and its associated ID is defined. In one embodiment, method 800 can use the IP address and port of each stream from the MRE 130 as the ID. Action 836 associates the MRE 130 with the internal modules of the MRM 120 such as the SCARP 230 and SCVRP 250.

At action 836, the MRE 130 is linked to one of the MRE sequential audio memory 330 in the SCARP 230 of the MRM 120, to one of the RTP compressed audio stream builders 350, to one of the MRE sequential video memories 430 in the SCVRP 250 of the MRM, and to one of the RTP compressed video stream builders 450, etc. Next, various connection parameters (external and internal) for the resources, which are associated with the relevant MRE 130, are set in action 838. External connection parameters can include an ID for the MRE 130, a remote IP address and port, and a local IP address and port. Internal connection parameters can include the internal connections of the modules in the MRM 120 itself, such as internal connections of the modules inside the SCARP 230 and the SCVRP 250, etc.

Next a decision is made in action 840 as to whether there are more MREs 130 to be handled. If yes, then method 800 returns to action 830 to manage the setup of the next MRE 130. If no, then method 800 proceeds to action 845 which involves the definition of the initial CP layout for each MRE 130 in the conference. Method 800 proceeds to action 850 in which another loop begins for each MRE 130 in the conference. At action 851 method 800 can load the relevant MRE 130 with the one or more image sizes that the MRE needs to send, the one or more compressed audio streams that the MRE 130 needs to send, and the one or more IDs that the MRE 130 will need to add in the audio and video RTP headers of each stream, etc. Parameters of the CP layout that is assigned to the MRE 130 can be calculated and loaded to the MREVM 550 at action 852. Parameters can include the number of segments in the layout, the ID or IP address and port that is associated with each segment, the MREs 130 that will be presented, the current speaker, etc. In other embodiments, each MRE 130 may define its own layout to be displayed on its own display unit and inform the MRM 120 of those parameters.

At action 852, the MRE 130's MREVM 550 can also be instructed to define the parameters of segment frame memories 650 and CP frame memories 670. The internal modules of MREAM 530, such as the audio RTP header parser and organizer module 720 and the audio mixer 750, for example, can be set in a similar way. One result of this action can be a map connecting the different modules of the MRE 130 to the relevant stream ID.

Next, method 800 sets the relevant parameters in the internal modules of the MRM 120, such as the SCARP 230 and SCVRP 250. At action 854, different parameters and connections of the internal modules of the SCVRP 250 are set. Parameters and connections can include the association of MRE sequential video memory 430 with an ID and/or an IP address and port of the MRE 130, and, the setting of the relevant MRE video multiplexer sequencer 452 to select the video of that MRE 130. At action 856, different parameters and connections of the internal modules of SCARP 230 are set. Parameters and connections can include association of MRE sequential audio memory with an ID and/or an IP address and port of the MRE 130, and the setting of the relevant MRE multiplexer sequencer 352 to select the audio of that MRE 130.

At action 858 the MRM 120 requests an Intra frame from the relevant MRE 130 and proceeds to action 860. At action 860, a decision is made whether more MREs 130 need setting. If yes, then method 800 returns to action 850. If no, then method 800 ends. A method similar to method 800 can be executed each time a main speaker changes or a new conferee is added or removed from the session, and so on.

Figure 8B:
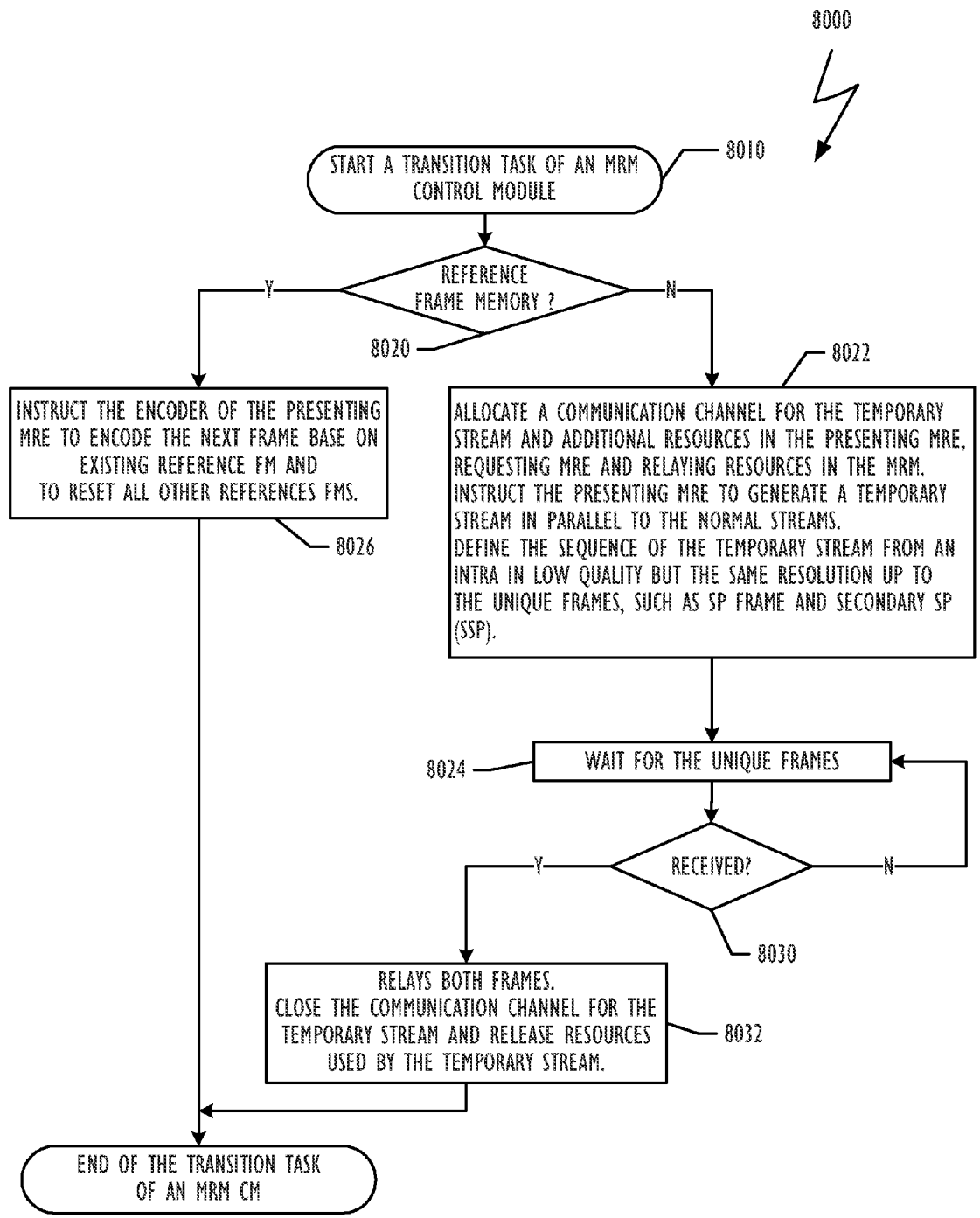
FIG. 8B is a flowchart illustrating relevant actions of a transition technique implemented by a signaling and control module of an MRM, according to one embodiment.

FIG. 8B is a flowchart illustrating relevant actions of a transition task 8000 implemented by an SCM 240 of an MRM 120 according to one embodiment. Task 8000 can be initiated in action 8010 when an Intra frame from a presenting MRE 130 is needed for a requiring MRE 130, while other receiving MREs that receive the same video image over a normal stream do not need an Intra frame. Such a case can occur when the requiring MRE 130 is a new participant that wishes to join an ongoing session, when a change in a layout that is used by the requiring MRE 130 occurs which does not occur in the other receiving MREs 130, or when one or more packets in the stream that is transmitted to the requiring MRE 130 were missed, etc.

After initiation 8010, the SCM 240 can verify in block 820 whether the requiring MRE 130 has a previously used reference frame associated with the relevant stream from the presenting MRE 130 (in the relevant size). The verification can be done by signaling from the requiring MRE 130 that is associated with the Intra request replacement indication. Alternatively, the SCM 240 can manage a history table storing the sequential number of a few frames (the last 16 frames, for example) that were recently sent from the presenting MRE 130 to each of MREs 130 over a normal stream. Based on the timing of the request and the historical table, the SCM 240 in action 8020 can deduce whether a previous reference frame exists in the decoder of the requiring MRE 130. If the SCM 240 changes the layout of the requiring MRE 130, the SCM 240 can conclude whether the previous reference frame can match the new layout, etc.

If in action 8020 a previously used reference frame exists in the decoder of the requiring MRE 130, then the SCM 240 can instruct in action 8026 the encoder of the relevant stream at the presenting MRE 130 to encode the next frame as an Inter frame based on the existing previous reference frame and to send the Inter frame over the normal stream to the requiring MRE 130 as well as to the rest of the receiving MREs 130. In addition, the encoder can be instructed to reset all other previous reference frames. In parallel, the SCM 240 can reset the history table of the relevant stream. Then method 8000 can be terminated. In other embodiments the Intra replacement request received from the requiring MRE 130 can be relayed to the encoder of the relevant stream in the presenting MRE 130, which is configured to respond by encoding the next frame as an Inter frame based on the previously used reference frame.

If in action 8020 a previously used reference frame does not exist in the decoder of the requiring MRE 130, then the SCM 240 can allocate in action 8022 a communication channel for the temporary stream as well as additional resources in SCVRP 250 and in the output section of the MREVM 550 of the presenting MRE 130, as well as adjusting the input section of the MREVM 550 of the requiring MRE 130 to handle the temporary stream. The allocated resources in the SCVRP 250 can comprise additional MRE sequential video memory 430 and additional RTP compressed video stream builder 450. The allocated resources in the MREVM 550 of the presenting MRE 130 can comprise the temporary encoder 687.

After allocating the resources and the bandwidth, the presenting MRE 130 can be instructed in action 8022 to start generating a temporary stream in parallel to the normal stream in the same size (resolution) according to a defined sequence. The defined sequence of the temporary stream can start from an Intra in low quality but the same resolution, followed by few enhanced quality Inter frames up to reaching a similar quality in both streams, the normal stream and the temporary stream. At the end of the sequence, each one of the encoders of the presenting MRE 130 encodes and sends a unique frame. The encoder 685 of the normal stream encodes and sends an SP frame over the normal stream toward the other receiving MREs, while the temporary encoder 687 can encode and send an SSP frame over the temporary stream.

After instructing the presenting MRE 130 to start sending the temporary stream, task 8000 may wait in action 8024 for receiving the unique frames (SP and SSP) from the presenting MRE 130. Upon receiving the unique frames in action 8030, the SP and the SSP frames are relayed in action 8032 to the other receiving MREs 130 and to the requiring MRE 130, respectively. The temporary stream can then be terminated, the allocated resources in the MRM 120, presenting MRE 130, and the requiring MRE can be released in action 8032, and task 8000 can be terminated.

Figure 9A:
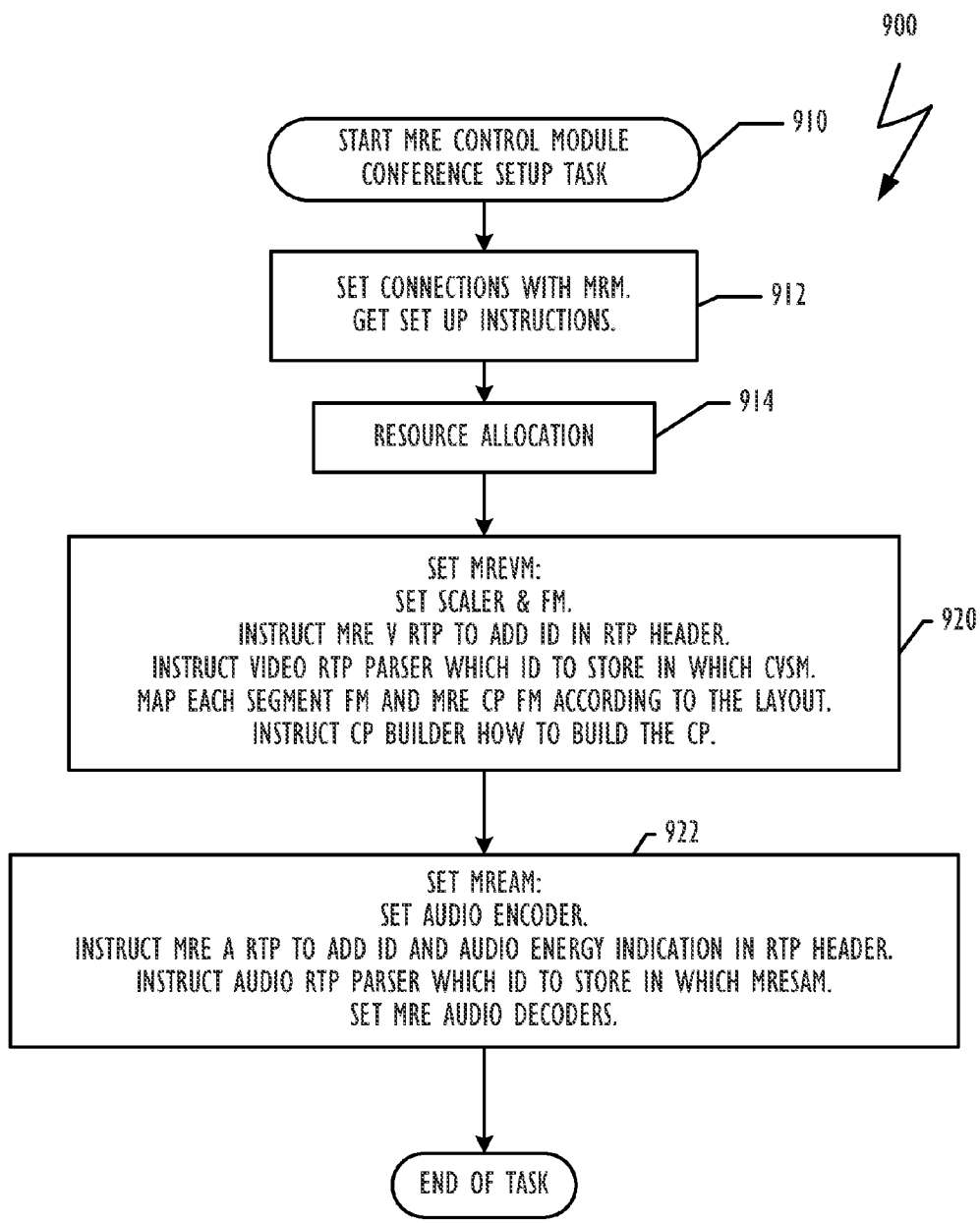
FIG. 9 is a flowchart illustrating relevant actions of an MRE control module conference setup technique according to one embodiment.

FIG. 9A is a flowchart illustrating relevant actions of an MRE conference setup method 900 implemented by one embodiment of an MRECM 540. Method 900 can be initiated at action 910. At action 912, a connection with MRM 120 is established and the MRECM 540 can receive setup instructions. Setup instructions can include one or more IDs that will be associated with the media streams sent from this MRE 130, the sizes of the images the MRE 130 will need to transmit, the number of conferees to be heard and displayed over the MRE 130, and the layout information. Method 900 can then allocate resources accordingly in action 914 including resources in the MRENI 520, the MREVM 550, the MREAM 530, bandwidth, etc.

Next, method 900 proceeds to action 920 where different internal modules of MREVM 550 are set. Those settings can include instructing the Video RTP header parser and organizer 620 based on IDs received at action 912, establish which relayed compressed video RTP data chunks to store in which CVSM 630, setting parameters of each segment FM 650 and MRE CP FM module 670 according to the layout of the session, instructing the CP builder 660 how to build the CP from the segments FM 650, updating the background FM 655, setting the Scaler and FM 680 to deliver the correct size, instructing the MREVRTP 690 to add the ID in the RTP header, etc. In action 920, the CP builder 660 is instructed on how to build the CP image. The instruction can define the MBA (Macro block address) of the first and last MB in each row in the CP frame, the first MBA in each segment and the last MBA of the segment, in the CP image, etc.

In some embodiments of MRE 130, in which the MRECM 540 and the MREVM 550 are adapted to add information to the displayed CP image, action 920 can be adapted to deliver this information. The information can indicate the current speaker, the conferee's name which is currently presented in each of the segments, etc. In such embodiments, the CP builder 660 can be adapted to convert the information into video data and add it to the CP image to be displayed over the endpoint.

Next, at action 922, different internal modules of the MREAM 530 are set. Settings can include setting the audio encoder 760 according to the compressed standard, instructing the MRE audio RTP to add the ID and audio energy indication in the RTP headers, instructing the audio RTP parser 720 which ID to store in which MRESAM 730, setting the MRE audio decoder 740, etc. After action 922, the method is complete and the relevant MRE 130 is ready to send an Intra frame. A method similar to the method 900 can be executed each time a main speaker changes or a new conferee is added or removed, etc.

Figure 9B:
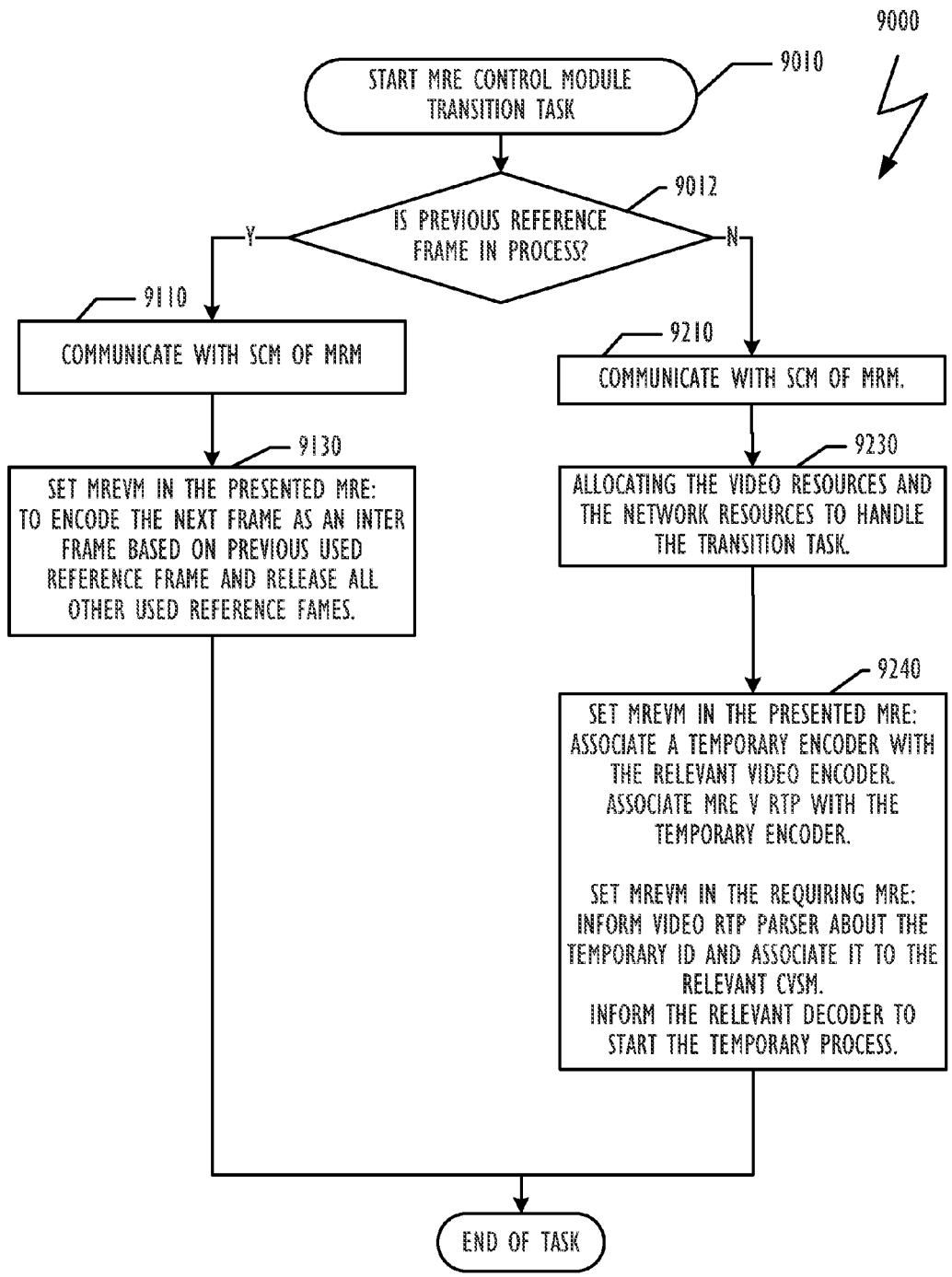

FIG. 9B is a flowchart illustrating relevant actions of a transition task 9000 implemented by an MRECM 540 of an MRE 130. The illustrated method 9000 comprises actions to be handled by a presenting MRE 130 and actions to be handled by a requiring MRE 130. Task 9000 can be initiated in action 9010 when an Intra frame from a presenting MRE 130 is needed for a requiring MRE 130, while other receiving MREs 130, which receive the same quality/size video image over a normal stream, do not need an Intra frame. Such a case can occur when the requiring MRE is a new participant that wishes to join an ongoing session, or when a change in a layout is needed by the requiring MRE 130 while it is not needed for the other receiving MREs 130, or when the requiring MRE 130 wishes to switch from one quality/size stream to another quality/size stream, etc. In addition, an Intra frame can be needed by the requiring MRE 130 and not by the other receiving MREs 130 when one or more packets in the stream that is transmitted to the requiring MRE are missed, etc.

The initiation 9010 of task 9000 can be done by the requiring MRE decoder 640 (FIG. 6), which is assigned to decode the compressed stream received from the presenting MRE 130. The task 9000 can be initiated when the decoder needs an Intra frame after receiving and decoding a plurality of previous Inter frames from the presenting MRE 130. The need for such an Intra frame can be due to packet loss, for example. Alternatively the task can be initiated by the SCM 240 of the MRM 120 when determining that an Intra frame of a certain steam, the normal stream, sent from the presenting MRE 130 is needed to be sent to the requiring MRE 130.

The method 9000 can be implemented in embodiments in which the encoders/decoders are configured to store a plurality of previous reference frames and to use an Intra replacement request instead of an Intra request. The Intra replacement request is a request for an Inter frame based on a previous reference frame. That request is sent from the requiring MRE 130 to the presenting MRE 130 indicating one of the stored previous reference frames. In such an embodiment, the task 9000 can be initiated in action 9010 by the requiring MRE decoder 640, which determines 9012 which of previous reference frames the decoder possesses can be used for decoding the next received encoded frame from the presenting MRE 130. The decision can be based on the time stamp of the reference frames. Then, an Intra replacement request together with the sequential number or the time stamp of the selected previous reference frame can be sent in action 9110 from the decoder of the requiring MRE 130 via the MRECM 540 to the SCM 240 of the MRM 120.

The SCM 240 of the MRM 120, in its turn, transfers in action 9110 the Intra replacement request together with the sequential number or the time stamp of the previous reference frame to the MRECM 540 of the presenting MRE 130. At the MRECM 540 of the presenting MRE 130, upon obtaining in action 9110 from the SCM 240 the Intra replacement request is transferred in action 9130 to the video encoder 685 of the presenting MRE 130, which is assigned to the relevant stream (quality/size) that is sent to the requiring MRE 130. The video encoder 685 is instructed in action 9130 to compress the next scaled frame received from the camera via the associated scaler 680 as an Inter frame based on the previous reference frame and to send it as the next Inter frame on the normal stream to all of the receiving MREs 130 including the requiring MRE 130. In addition, the encoder 685 is instructed to release all other previous reference frames, and method 9000 is terminated. In embodiments in which the SCM 240 of the MRM 120 changes the sequential number of the relay frames received from the presenting MRE 130 while sending them as relayed frames to the receiving MREs 130, the SCM 240 can convert the sequential number received from the requiring MRE to the appropriate sequential number that had been sent from the presenting MRE 130 to the MRM 120.

If in action 9012 it is determined that a previous reference frame cannot be used, then task 9000 can continue to action 9210 and to communicate with the SCM 240 of the MRM 120. In the communication with the SCM 240, the MRECM 540 of the presenting MRE 130 can be instructed to open a new connection for the temporary stream in parallel to the normal stream, an ID can be allocated to the temporary stream, the size (resolution) of the encoded image of the temporary stream is defined to be the same as the normal stream, the number of quality enhanced frames in the temporary stream can be defined, etc.

If the temporary stream is a new stream that is sent from the presenting MRE 130, the MRECM 540 of the requiring MRE 130 may get in block 9210 from the SCM 240 the one or more IDs of the new relayed stream and the video parameters related to this stream, such as the size (resolution) of the video image, the location of the associate segment in the CP layout, etc. as disclosed above in the description of FIGS. 9A and 8A. If the temporary stream is not a new stream that is sent from the presenting MRE 130, then the MRECM 540 of the requiring MRE 130 may just be informed that the following frames of the stream received from the presenting MRE 130 belong to the temporary stream.

After obtaining in action 9210 the relevant information regarding the transition period from the SCM 240, the MRECM 540 of the presenting MRE 130 and the requiring MRE 130, the method 9000 can start allocating, in action 9230, the required resources to handle the transition period in both MREs 130. The resources can be communication and bandwidth resources in the MRENI 520, internally communication resources between the MRENI 520 and the MREVM 550, and externally between the MRENI 520 and the NI 220 in the MRM 120. Additional allocated resources can be video resources in the MREVM 550, etc.

At action 9240 the allocated resources are organized to handle the temporary stream. At the MREVM 550 of the presenting MRE 130 the input of temporary encoder 687 is associated with the encoder of the normal stream. In one embodiment, the association is for obtaining the same scaled video image from the associated scaler 680 as well as to get the appropriate set of quantization parameters for the regular Inter frames as well as for the SP and SSP frames, for example. In other embodiments, the association is for obtaining the reference frame of the encoder of the normal stream and using it as an input video image to be encoded by the temporary encoder 687. Further, the output of the of the temporary encoder 687 of the presenting MRE 130 can be associated with the MREVRTP 690 in order to be associated with the appropriate ID number as well as a time stamp.

In one embodiment, in which the SP frame is used over the normal stream and the SSP frame is used over the temporary stream, the requiring MRE 130 video decoder 640 will receive a compressed Intra frame in low quality, then few enhanced quality Inter frames, followed by the SSP frame. This sequence complies with the compression standard. The frames that will follow the SSP frame will be Inter frames from the normal stream.

Further, if the temporary stream is a new stream that is sent from the presenting MRE 130 via the MRM 120, then the MRECM 540 of the requiring MRE 130 may be organized in action 9240 to handle the new stream and the RTP video input buffer 610 and video RTP Parser 620 can be informed about the ID of the new stream and be associated with a CVSM 630. The MRE video encoder 640 can be associated to that CVSM, etc.

Yet, in another embodiment in which the reference frame of the normal encoder is compressed (in lossless compression) and transmitted over the temporary stream, in addition to the relevant activity of some embodiments as described above, the relevant MRE video decoder 640 of the requiring MRE 130 is informed in action 9240 when to change the compression standard from the normal compression to the unique one (the lossless compression) that is used to compress the reference frame, and vice versa.

After organizing in action 9240 the MREVM 550 of the presenting MRE 130 and the requiring MRE 130, the transition period can be further executed autonomously by the MREVM 550 of the presenting MRE 130 and the requiring MRE 130 as well as the SCVRP 250 of the MRM 120. Thus, method 9000 can be terminated.

Figure 10A:
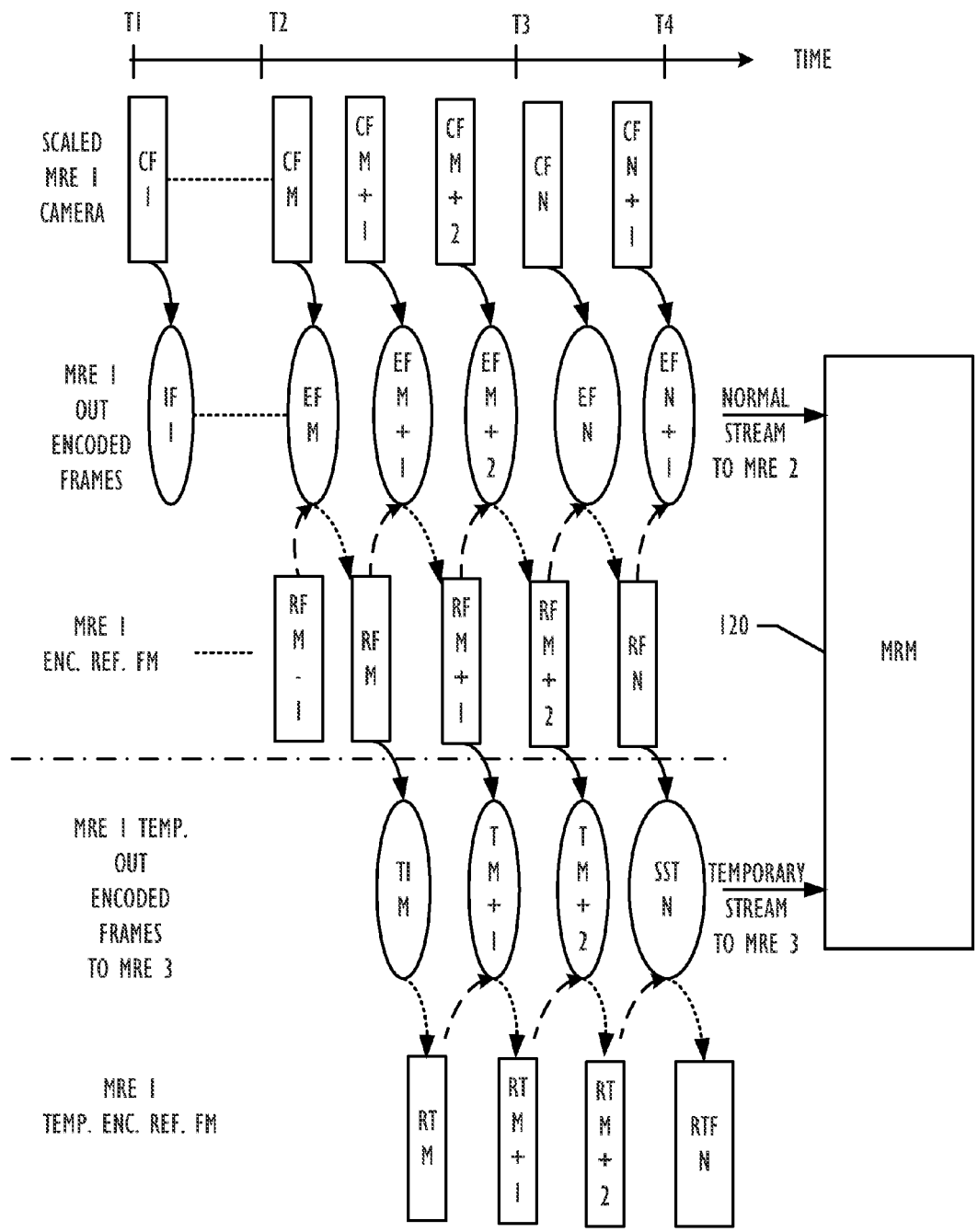
FIGS. 10A and 10B are timing diagrams illustrating a transition period, using special frames of a video stream generated from one MRE and transmitted to two other MREs via an MRM according to one embodiment.
Figure 10B:
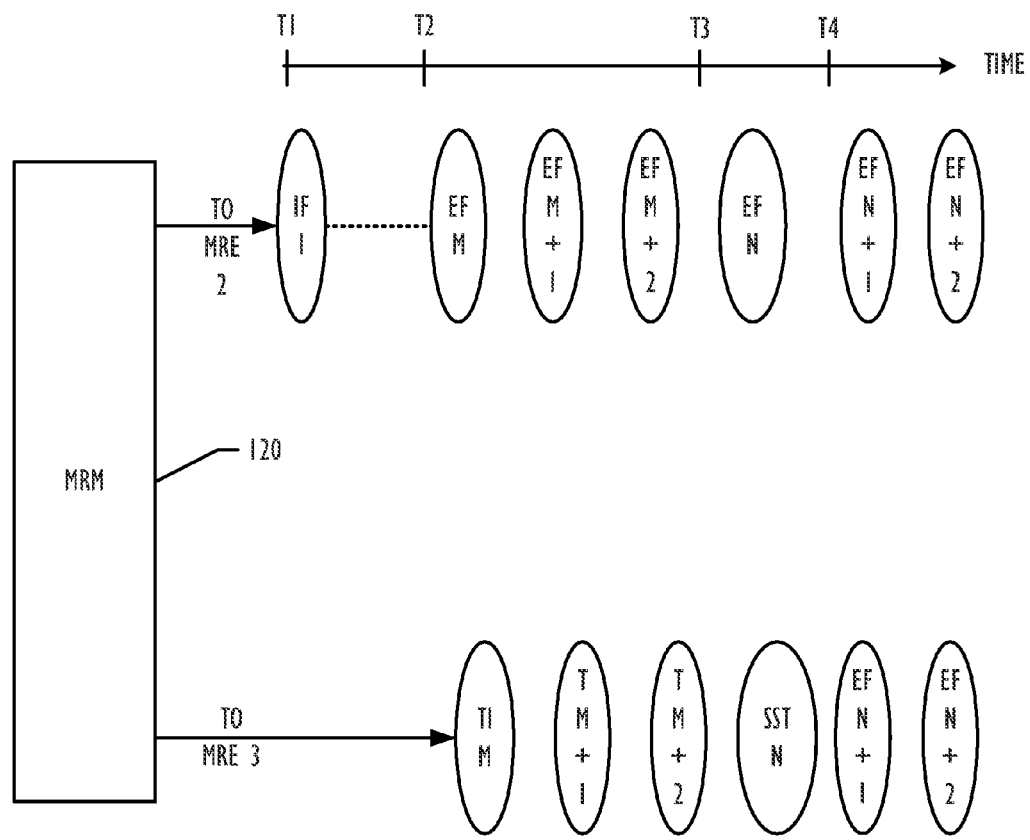

FIGS. 10A and 10B are timing diagrams illustrating a transition period in one embodiment that uses unique frames of a video stream generated from MRE 1 (presenting MRE 130) and transmitted to MREs 2 & 3 (receiving and requiring MREs 130, respectively) via an MRM 120. FIGS. 10A and 10B are for illustration purposes only and are not drawn to scale.

FIG. 10A has two sections, the top section illustrates the normal stream and the bottom section illustrates the temporary stream in relation to the presenting MRE 130, MRE 1. The two sections are illustrated by five rows and a time axis that serves both sections. The first row illustrates a stream of scaled camera video images (CF1 to CFn+1) received from the video camera of MRE 1 after scaling by the scaler and FM 680. The second row illustrates a stream of encoded video frames, (IF1 to EFn+1) at the output of the normal encoder of MRE 1. This stream of encoded frames is transmitted as a normal stream to an MRM 120, which manages the MRC session. The third row illustrates a stream of reference frames (RFm−1 to RFn) stored in the encoder of MRE 1 as result of encoding the relevant scaled video frame received from the camera. The third row is the last row of the top section.

The bottom section of FIG. 10A illustrates the temporary stream starting with the fourth row that illustrates a stream of encoded video frames (TIm to Tm+2, and the SSTn) at the output of a temporary encoder of MRE 1. This stream of encoded frames is transmitted as a temporary stream toward the MRM 120. The last row illustrates a stream of reference frames (RTm to RTm+2 and RTFn) stored in the temporary encoder 687 of MRE 1.

In this example the temporary stream is created by encoding the reference frame of the normal encoder 685 as illustrated by the arrows between the third and fourth rows. The first frame (TIm) is encoded as an Intra frame in the same size (resolution) but in lower quality. The next two frames are enhanced Inter frames. Each frame improves the quality and decreases the difference between the reference frame that is stored in the encoder of the normal stream and the relevant reference frame that is stored in the temporary encoder 687. In other embodiments, the number of the enhanced Inter frames can be other than two frames, such as any number between one to 15 frames, for example. The last frame of the temporary stream, SSTn is a unique frame that is compressed in a way that the reference frame RTFn has the same values as the reference frame RFn of the normal encoder, synchronizing the reference frame RTFn with the reference frame RFn. In one embodiment, the difference between the RFn at the input of the temporary encoder and the reference frame RTm+2, stored in the temporary encoder 687 can be compressed in lossless compression to create the SSTn frame and thus the value of each pixel in the RTFn is the same as the value of the corresponding pixel in the RFn.

The normal stream from MRE 1 is initiated at T1 upon receiving the video frame CF1 from the camera of MRE 1 after scaling. The encoder of the normal stream compresses it as an Intra frame, IF1. The following scaled camera frames are encoded as Inter frames. The compression standard can be H.264 AVC, H.264 annex G, MPEG-4, etc.

At T2, MRE 3 requests to join the receiving MREs of the normal stream. Therefore, at T2 an Intra request is sent from MRE 3 requesting an Intra frame from MRE 1. Instead of responding to the request by sending an Intra frame to all of the receiving MREs 130 of the normal stream, MRE 1, the presenting MRE 130, may initiate a temporary stream, illustrated in the bottom section of FIG. 10A.

The first frame from the camera that follows the Intra request, CFm, is compressed based on the reference frame that was generated while compressing the previous frame, RFm−1. In the embodiment of FIG. 10A, the reference frame RFm, which was created by compressing CFm as an Inter frame EFm on the normal stream, is compressed as an Intra frame TIm of the temporary stream. The Intra frame TIm is sent as the first frame on the temporary stream toward MRE 3. The compression of the temporary stream is done by using the same compression standard that is used in the encoder of the normal stream, but the quality of the Intra frame can be lower than the quality of the normal stream. The quality can differ in bit rate, sharpness, etc.

The following few reference frames of the encoder of the normal stream RFm+1, RFm+2, are encoded as enhanced quality Inter frames by the temporary encoder to create the following Inter frames Tm+1 and Tm+2. The number of enhanced quality Intra frames can be any number between one and 15, for example. The number of enhanced quality frames can be defined during the establishment of the temporary stream.

At T3, upon assuming that the quality of the two streams is similar, the following scaled camera frame, CFn, is compressed as an Inter frame EFn. The reference frame, RFn, which was created while compressing CFn, may be compressed by the temporary encoder 687 in lossless compression to generate the unique frame SSTn. The lossless compression can be executed on the difference of the values between RFn and the reference frame of the temporary stream, RTm+2, for example, taking advantage of the fact that in video conferencing the difference between two consecutive frames is smaller compared to normal video images. Examples of lossless compression can be ZIP, Lempel-Ziv-Welch (LZW), lossless JPEG 2000, etc. Thus, the generated reference frame at the temporary encoder 687, RTFn, has the same values as RFn, synchronizing the reference frame RTFn with the reference frame RFn. Further, decoding of the unique frame at the decoder of MRE 3 will generate a reference frame having the same values of the RFn and RTFn. Consequently, at this point of time the temporary stream can be terminated and the normal stream can be switched by the MRM 120 to the requiring MRE 3 as it is illustrated in FIG. 10B.

At the requiring MRE 3, the decoding of the encoded differences can be done as inverse operation of the lossless encoding. The results will be added to the values of the previous decoder reference frame, which is similar to RTm+2. The results of adding the decoded differences can be stored as the reference frame RTFn in the decoder of MRE 3 and can be displayed on MRE 3. At T4, the temporary stream can be terminated.

Looking on the other side of the MRM 120 at FIG. 10B, at T1 the first frame of the normal stream of the presenting MRE 1, Intra frame IF1, is sent toward MRE 2, followed by a plurality of Inter frames. The normal stream can be relayed to a plurality of receiving MREs 130 (not shown in the figure) in parallel to MRE 2. At T2, MRE 3 asks to receive the normal stream and requests an Intra frame. In response, the MRM 120 starts sending the frames of the temporary stream toward the requiring MRE 3. The first frame is the Intra frame, TIm, followed by few enhanced quality Inter frames, Tm+1 and Tm+2. Next, at T3, the unique frame SSTn is sent as the last frame of the temporary stream. At T4, Inter frames Fn+1, Fn+2, and following frames from the normal stream are relayed also toward MRE 3.

Figure 11A:
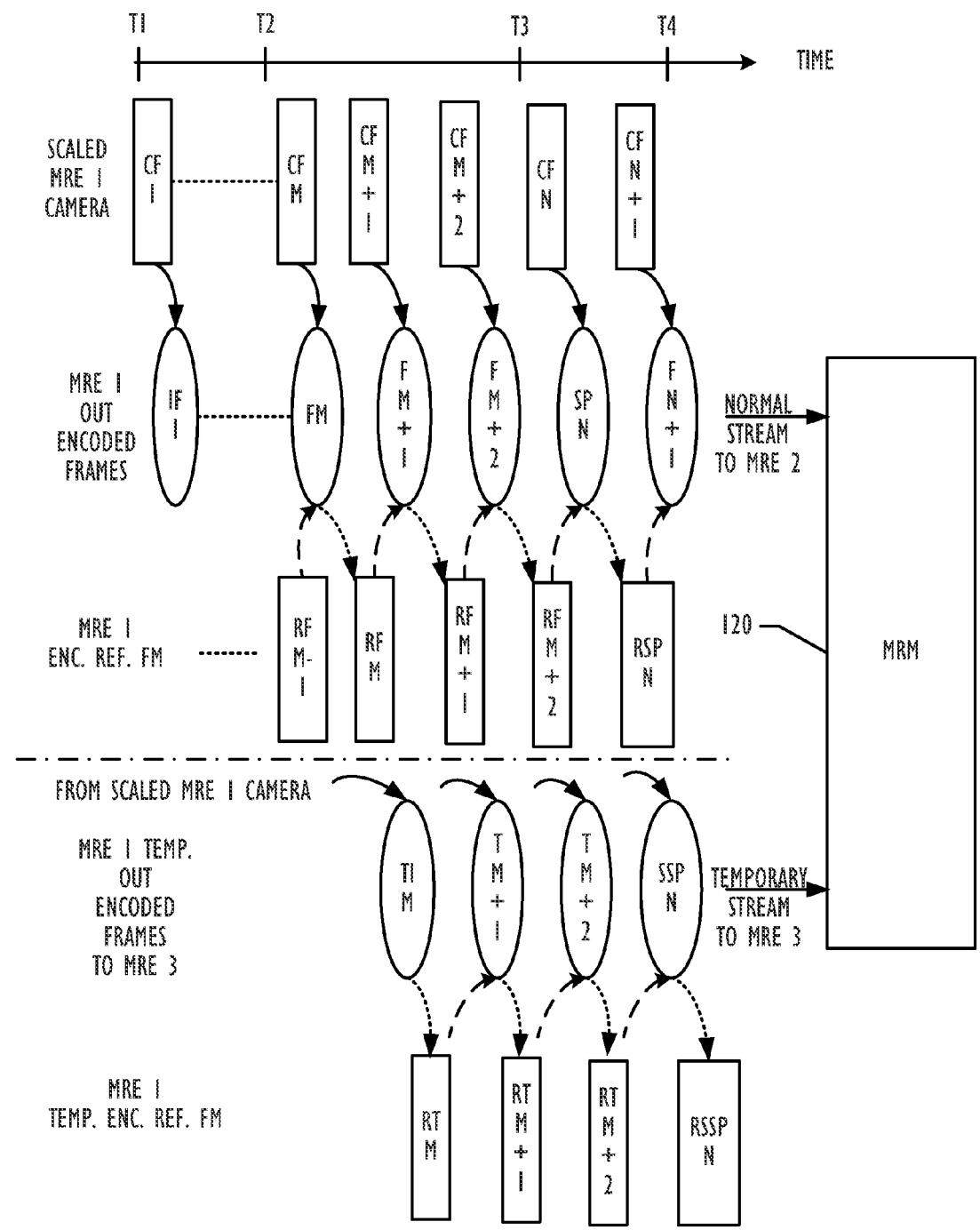
FIGS. 11A and 11B are timing diagrams illustrating a transition period, using special frames of a video stream generated from one EP and transmitted to two other MREs via an MRM, according to one embodiment.
Figure 11B:
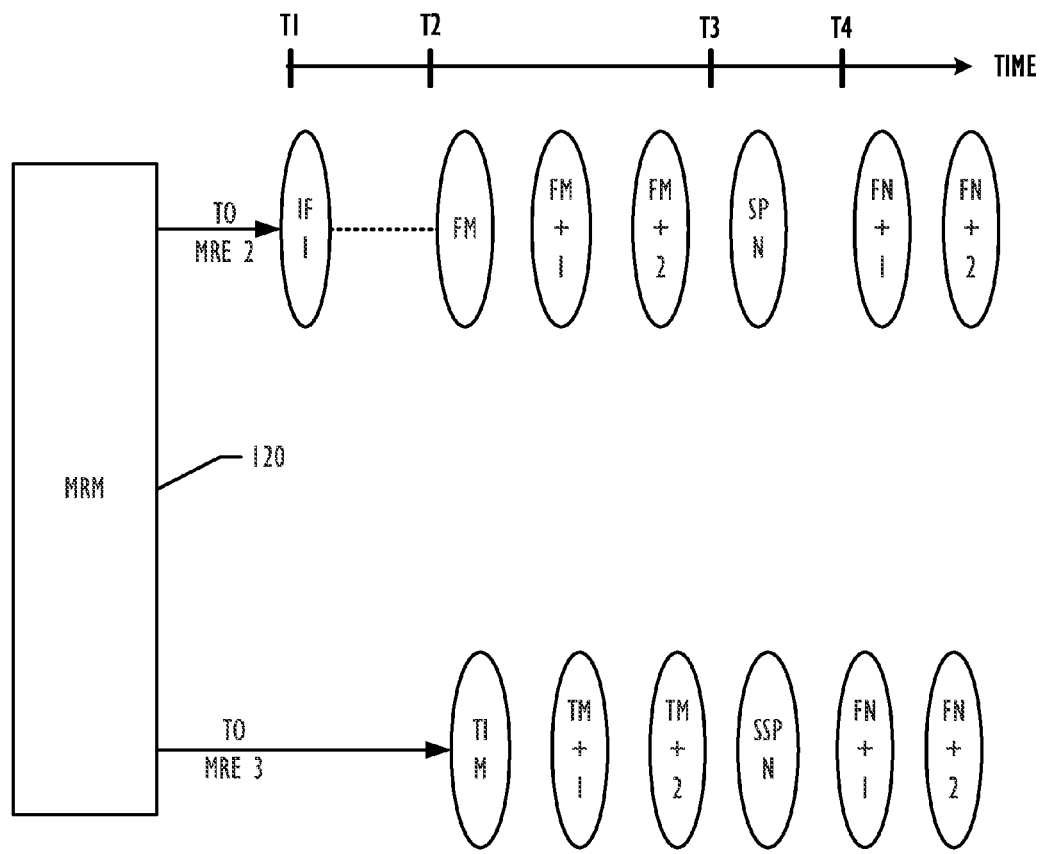

FIGS. 11A and 11B are timing diagrams illustrating a transition period in another embodiment that uses SP and SSP frames in order to move from one stream to the other. The two streams are generated from the same video camera having the same size (resolution). The video streams are generated by MRE 1, the presenting MRE 130, and transmitted to MREs 2 & 3 (receiving and requiring MREs 130, respectively) via an MRM 120. FIGS. 11A and 11B are for illustration purposes only and are not drawn to scale.

Similar to FIG. 10A, FIG. 11A also has two sections. The top section illustrates the normal stream and the bottom section illustrates the temporary stream from MRE 1. The two sections are illustrated by five rows and a time axis that serves both sections. The first row illustrates a stream of scaled camera video images (CF1 to CFn+1) received from the video camera of MRE 1 after scaling by the scaler and FM 680. The second row illustrates a stream of encoded video frames (IF1 to Fn+1, including SPn) at the output of the normal encoder of MRE 1. This stream of encoded frames is transmitted as a normal stream to an MRM 120, which manages the MRC session. The third row illustrates a stream of reference frames (RFm−1 to RFm+2 and RSPn) stored in the normal encoder 685 of MRE 1 as result of encoding the relevant scaled video frame received from the camera. The third row is the last row of the top section.

The bottom section of FIG. 11A illustrates the temporary stream started with the 4th row that illustrates a stream of encoded video frames (TIm to Tm+2, and the SSPn) at the output of a temporary encoder 687 of MRE 1. This stream of encoded frames is transmitted as a temporary stream toward the MRM 120. The last row illustrates a stream of reference frames (RTm to RTm+2 and RSSPn) stored in the temporary encoder 687 of MRE 1.

In this example the temporary stream is created by encoding the same scaled video frame at the output of the Scaler and FM 680 that is associated with the normal encoder 685 as it is illustrated by the arrows at the top of the compressed frames TIm to SSPn. Thus, the two encoders, the normal encoder 685 and the temporary encoder 687, encode the same input frames. The first frame (TIm) is encoded as an Intra frame in the same size (resolution) but in lower quality. The next two frames are enhanced Inter frames. Each frame improves the quality and decreases the difference between the scaled frame at the input of the temporary encoder 687 and the relevant reference frame that is stored in the temporary encoder 687. In other embodiments, the number of the enhanced Inter frames can be other than two frames, including any number between one to 15 frames, for example. The last frame of the temporary stream is the scaled camera frame CFn that is compressed as a regular SSP frame and generated as the SSPn frame. The same scaled camera frame CFn is scaled as a regular SP frame by the normal encoder 685. The result of the SP and SSP encoding is that the reference frame of the normal stream RSPn and the reference frame of the temporary stream RSSPn have the same values, synchronizing the reference frame RSPn and the reference frame RSSPn. Because the reference frames of the decoders of the normal stream and the temporary stream have the same values, the temporary stream can be terminated, and the MRM 120 can relay the following frames of the normal stream to the requiring MRE 3.

The normal stream from MRE 1 is initiated at T1 upon receiving the scaled video frame CF1 from the camera of MRE 1 after scaling. The encoder 685 of the normal stream compresses it as an Intra frame, IF1. The following scaled camera frames are encoded as Inter frames. The compression standard can be any standard, such as H.264 AVC, H.264 annex G, etc. that is capable of processing SP and SSP frames.

At T2, MRE 3 asks to join the receiving MREs 130 of the normal stream. Therefore, at T2 an Intra request is sent from MRE 3 requesting an Intra frame from MRE 1. In one embodiment, instead of responding to the request by sending an Intra frame to all of the receiving MREs 130 of the normal stream, MRE 1, the presenting MRE 130, may initiate a temporary stream as illustrated in the bottom section of FIG. 11A.

The first frame from the camera after scaling that follows the Intra request, CFm, is compressed, based on the reference frame that was generated while compressing the previous frame, RFm−1. In the embodiment of FIG. 11A, the same scaled camera frame CFm is compressed as an Intra frame TIm of the temporary stream. The Intra frame TIm is sent as the first frame on the temporary stream toward MRE 3. The compression of the temporary stream is done by using the same compression standard that is used in the encoder 685 of the normal stream, but the quality of the Intra frame can be lower than the quality of the normal stream. The quality can differ in bit rate, sharpness, etc.

The following few scaled camera frames CFm+1, CFm+2, are encoded as enhanced quality Inter frames by the temporary encoder 687 to create the following Inter frames Tm+1 and Tm+2. The number of enhanced quality Inter frames can be any number between one and 15, for example.

At T3, upon assuming that the quality of the two streams is similar, the following scaled camera frame, CFn, is compressed by the normal encoder as a regular SP frame, SPn, and is sent over the normal stream. The same scaled camera frame, CFn, is compressed by the temporary encoder 687 as a regular SSP frame, SSPn, and is sent as the last frame over the temporary stream. Therefore, the generated reference frame at the temporary encoder, RSSPn, has the same values as the reference frame of the normal encoder, RSPn. Further, decoding of the SPn frame at the decoder of MRE 2 will generate a reference frame having the same values as the RSPn. Decoding of the SSPn at the decoder of MRE 3 will generate a reference frame having the same values as the RSSPn. Because RSSPn and RSPn have the same values, the encoder/decoders comprise the same reference frames. Consequently, at this point of time the temporary stream can be terminated at T4 and the normal stream can also be switched by the MRM 120 to the requiring MRE 3 as it is illustrated in FIG. 11B.

Looking on the output side of the MRM 120 in FIG. 11B, at T1 the first frame of the normal stream of the presenting MRE 1, Intra frame IF1, is sent toward MRE 2, followed by a plurality of Inter frames. The normal stream can be relayed to a plurality of receiving MREs 130 (not shown in the figure) in parallel to MRE 2. At T2, MRE 3 asks to receive the normal stream and requests an Intra frame. In response the MRM 120 starts relaying the frames of the temporary stream toward the requiring MRE 3. The first frame is the Intra frame TIm, followed by few enhanced quality Inter frames, Tm+1 and Tm+2. Next, at T3, the unique frame SSPn is send as the last frame of the temporary stream. At T4, Inter frames Fn+1, Fn+2, and the following frames from the normal stream are also relayed toward MRE 3.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method comprising:
    sending a first compressed video stream from a first media relay endpoint to be transferred toward a second media relay endpoint;
    creating a second compressed video stream by the first media relay endpoint to be transferred toward a third media relay endpoint, comprising:
        synchronizing a first reference frame in a first encoder of the first media relay endpoint with a second reference frame in a second encoder of the first media relay endpoint;
        sending a first compressed video frame in the first compressed video stream, encoded by the first encoder from the first reference frame; and
        sending a second compressed video frame in the second compressed video stream, encoded by the second encoder from the second reference frame.

2. The method of claim 1, further comprising:
    receiving a request for an intra frame to be sent toward the third media relay endpoint,
    wherein the act of creating the second compressed video stream by the first media relay endpoint to be transferred toward the third media relay endpoint is performed responsive to the request for an intra frame.

3. The method of claim 1, wherein the act of synchronizing a first reference frame in a first encoder of the first media relay endpoint with a second reference frame in a second encoder of the first media relay endpoint comprises:
    creating a first sequence of reference frames in the first encoder by encoding a first sequence of video frames in the first video stream by the first encoder; and
    creating a second sequence of reference frames in the second encoder by encoding a second sequence of video frames in the second video stream by the second encoder, the second sequence of video frames encoded based on the first sequence of reference frames,
    wherein the second sequence of reference frames is successively more synchronized with the first sequence of reference frames, and
    wherein a last reference frame of the second sequence of reference frames is synchronized with a last reference frame of the first sequence of reference frames.

4. The method of claim 3, wherein the second sequence of video frames comprises:
    an intra frame of lower quality than a video frame of the first video stream; and
    a sequence of inter frames of increasing quality.

5. The method of claim 3, wherein a last video frame of the second sequence of video frames is a unique compressed frame.

6. The method of claim 3, wherein a difference between a current frame of the first sequence of reference frames and an immediately preceding reference frame of the second sequence of reference frames is losslessly compressed to create the last frame of the second sequence of video frames.

7. The method of claim 6, wherein the difference is losslessly compressed using ZIP.

8. The method of claim 3, wherein the first sequence of video frames is a sequence of inter frames.

9. The method of claim 1, wherein the first compressed video stream and the second compressed video stream comply with H.264.

10. The method of claim 1, further comprising:
    terminating the second video stream; and
    sending the first video stream to be transferred toward the second media relay endpoint and the third media relay endpoint.

11. The method of claim 1, wherein the first video stream is sent for relaying toward a plurality of media relay endpoints.

12. The method of claim 1, wherein the act of synchronizing a first reference frame in a first encoder of the first media relay endpoint with a second reference frame in a second encoder of the first media relay endpoint comprises:
    creating a first sequence of reference frames in the first encoder while encoding the first compressed video stream; and
    creating a second sequence of reference frames in the second encoder while encoding the second compressed video stream,
    wherein the first compressed video stream and the second compressed video stream are encoded from a same sequence of scaled video images.

13. The method of claim 12, wherein the second compressed video stream comprises:
    an intra frame of lower quality than a video frame of the first compressed video stream; and
    a sequence of inter frames of increasing quality.

14. The method of claim 13, wherein the first compressed video stream comprises a stream of inter frames.

15. The method of claim 12, wherein a current video frame of the same sequence of scaled video images is encoded by the first encoder as a switching predictive (SP) frame and by the second encoder as a secondary switching predictive (SSP) frame.

16. The method of claim 15, further comprising terminating the second compressed video stream after sending the SSP frame, wherein a video frame of the second compressed video stream is an SSP frame.

17. A media relay multipoint control unit for providing a continuous presence layout at a first media relay endpoint during a multipoint video conference between the first media relay endpoints and a plurality of media relay endpoints, the continuous presence layout comprising a plurality of segments, each segment displaying video from a selected media relay endpoint of the plurality of media relay endpoints, the media relay multipoint control unit comprising:
  a network interface that receives relay compressed video data chunks from the plurality of media relay endpoints and sends relayed compressed video data chunks to the first media relay endpoint;
  a signaling and control module that selects two or more media relay endpoints from the plurality of media relay endpoints; and
  a compressed video processor that
    parses the received relay compressed video data chunks;
    organizes the parsed relay compressed video data chunks received from the selected two or more media relay endpoints into a group of two or more streams of relayed compressed video data chunks; and
    transfers the group of two or more streams of relayed compressed video data chunks toward the first media relay endpoint via the network interface,
  wherein the compressed video processor, in response to receiving instructions from the signaling and control module that an intra frame is requested by a requiring media endpoint from a presenting media relay endpoint of the selected two or more media relay endpoints:
    obtains a temporary stream of relay compressed video data chunks in parallel to obtaining a normal stream of relay compressed video data chunks, both from the presenting media relay endpoint;
    parses the obtained relay compressed video data chunks over the temporary stream;
    organizes the parsed relay compressed video data chunks into a temporary stream of relayed compressed video data chunks; and
    transfers the temporary stream of relayed compressed video data chunks toward the requiring media relay endpoint via the network interface.

18. The media relay multipoint control unit of claim 17, wherein the compressed video processor is further configured to respond to instructions received from the signaling and control module that the temporary stream is terminated by relaying normal relayed compressed video data chunks obtained from the presenting media relay endpoint toward the requiring media relay endpoint.

19. A media relay endpoint, comprising:
  a video processor comprising:
    a first encoder; and
    a temporary encoder,
  wherein the video processor is configured to:
    send a first video stream compressed by the first encoder for relaying toward a second media relay endpoint;
    send a temporary video stream compressed by the temporary encoder for relaying toward a third media relay endpoint, when receiving an indication that an intra frame is needed by the third media relay endpoint;
    synchronize a first reference frame in the first encoder with a second reference frame in the temporary encoder; and
    terminate the temporary video stream.

20. The media relay endpoint of claim 19, wherein the indication is an intra request received from the third media relay endpoint.

21. The media relay endpoint of claim 19, wherein the video processor synchronizes by creating a switching predictive (SP) frame by the first encoder and a secondary switching predictive (SSP) frame by the temporary encoder.

22. A media relayed endpoint (MRE), comprising:
  an MRE video processor that:
    receives a group of streams of relayed compressed video data chunks originating from a group of selected MREs;
    organizes the received relayed compressed video data chunks into a plurality of groups, each group corresponding to an MRE of the group of selected MREs;
    decodes each group of organized received relayed compressed video data chunks; and
    assembles a continuous presence layout from the decoded organized received relayed compressed video data chunks,
  wherein the MRE video processor is configured to:
    obtain a temporary stream of relayed compressed video data chunks sent from a first MRE;
    organize, decode, and assemble video from the temporary stream in the layout;
    synchronize a reference frame in a decoder allocated to decode a common video stream received from the first MRE; and
    organize, decode, and assemble video from the common stream in the layout.

* * * * *

UNITED STATES PATENT AND TRADEMARK OFFICE
CERTIFICATE OF CORRECTION

| | | |
|---|---|---|
| PATENT NO. | : 8,760,492 B2 | |
| APPLICATION NO. | : 13/487703 | |
| DATED | : June 24, 2014 | |
| INVENTOR(S) | : Avishay Halavy, Efrat Be'ery and Erez Harel | |

It is certified that error appears in the above-identified patent and that said Letters Patent is hereby corrected as shown below:

In the Specification

In Col. 4, line 21, replace "FIG. 9 is a flowchart" with --FIGs. 9A and 9B are flowcharts--.

Signed and Sealed this
Thirtieth Day of September, 2014

Michelle K. Lee
*Deputy Director of the United States Patent and Trademark Office*